US007761301B2

(12) United States Patent
Xu

(10) Patent No.: US 7,761,301 B2
(45) Date of Patent: Jul. 20, 2010

(54) PROSODIC CONTROL RULE GENERATION METHOD AND APPARATUS, AND SPEECH SYNTHESIS METHOD AND APPARATUS

(75) Inventor: Dawei Xu, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 808 days.

(21) Appl. No.: 11/583,969

(22) Filed: Oct. 20, 2006

(65) Prior Publication Data

US 2007/0094030 A1 Apr. 26, 2007

(30) Foreign Application Priority Data

Oct. 20, 2005 (JP) ............................. 2005-306086

(51) Int. Cl.
*G10L 13/08* (2006.01)
*G10L 13/00* (2006.01)
*G06F 17/20* (2006.01)
*G06F 17/27* (2006.01)

(52) U.S. Cl. .............................. 704/260; 704/1; 704/9; 704/258

(58) Field of Classification Search ....................... None
See application file for complete search history.

(56) References Cited

U.S. PATENT DOCUMENTS 5,384,893 A * 1/1995 Hutchins .................... 704/267
7,136,802 B2 * 11/2006 Ying et al. ..................... 704/1
7,136,816 B1 * 11/2006 Strom ........................ 704/260
7,200,558 B2 * 4/2007 Kato et al. .................. 704/244
7,558,732 B2 * 7/2009 Kustner et al. .............. 704/260
2007/0129938 A1 * 6/2007 Wang et al. ................... 704/10

FOREIGN PATENT DOCUMENTS

JP 10-83192 3/1998

OTHER PUBLICATIONS

Chou, F. et al. “Automatic generation of prosodic structure for high quality mandarin speech synthesis,” Proceeding of the 4th Int'l Conferance on Spoken Language Processing, 1996.*
Pan, N. et al. “Prosody model in mandarin TTS system based on a hierarchical approach,” IEEE Conf. on Multimedia and Expo, 2000.*
Office Action dated Dec. 22, 2009 in Japanese Patent Application No. 2005-306086, and English-language translation thereof.
Yasushi Ishikawa; “Prosodic Control for Japanese Text-to-Speech Systems Using Statistical Language Models”, Study Report of the Information Processing Society, vol. 2000 No. 101 IPSJ SIG Notes, Japan, Information Processing Society of Japan, Oct. 27, 2000, pp. 31-36.

* cited by examiner

*Primary Examiner*—Matthew J Sked
(74) *Attorney, Agent, or Firm*—Nixon & Vanderhye PC

(57) ABSTRACT

A prosodic control rule generation method includes dividing an input text into language units, estimating a punctuation mark incidence at a boundary between language units in the input text, the punctuation mark incidence indicating a degree that a punctuation mark occurs at the boundary, based on attribute information items of a plurality of language units adjacent to the boundary, and generating a prosodic control rule for speech synthesis including a condition for the punctuation mark incidence based on a plurality of learning data items each concerning prosody and including the punctuation mark incidence.

27 Claims, 10 Drawing Sheets

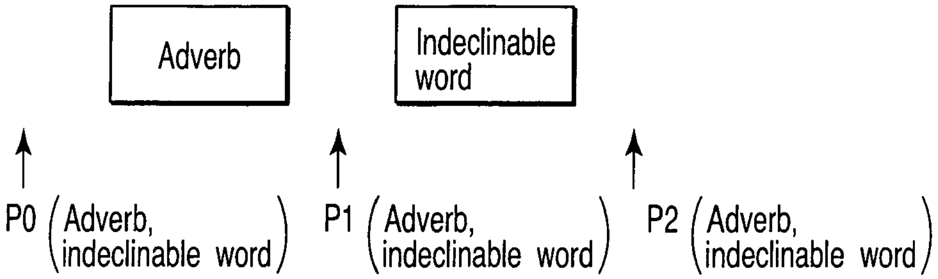

F I G. 2

First DB

P0 (Adverb, indeclinable word) = 45.2
P1 (Adverb, indeclinable word) = · · ·
P2 (Adverb, indeclinable word) = · · ·

P0 (Subjective post-positional particle, adverb) = · · ·
P1 (Subjective post-positional particle, adverb) = 26.2
P2 (Subjective post-positional particle, adverb) = · · ·

P0 (Indeclinable word, subjective post-positional particle) = · · ·
P1 (Indeclinable word, subjective post-positional particle) = · · ·
P2 (Indeclinable word, subjective post-positional particle) = 15.0

⋮

F I G. 3

PROSODIC CONTROL RULE GENERATION METHOD AND APPARATUS, AND SPEECH SYNTHESIS METHOD AND APPARATUS

CROSS-REFERENCE TO RELATED APPLICATIONS

This application is based upon and claims the benefit of priority from prior Japanese Patent Application No. 2005-306086, filed Oct. 20, 2005, the entire contents of which are incorporated herein by reference.

BACKGROUND OF THE INVENTION

1. Field of the Invention

The present invention relates to speech synthesis.

2. Description of the Related Art

Conventional text speech synthesis apparatuses often carry out syntactic analysis in which the modification relations of a text are analyzed in order to obtain clue information for prosody control from the text. Syntactic analysis for completely analyzing the modification relations of one sentence generally requires a large number of calculations. Thus, to obtain modification information on a text with a small number of calculations, for example, JP-A 10-83192 (KOKAI) (Document 1) discloses a method of carrying out syntactic analysis on the basis of the pre-specified strength of the dependence between prosodic word types to determine the strengths of prosodic phase boundaries. Speech synthesis apparatus performs prosodic control using prosodic information generation means characterized by generating prosodic information for text information taking into account the strengths of prosodic phase boundaries obtained from the text.

Document 1 requires advanced expertise to define the strength of the dependence between prosodic word types. Document 1 thus disadvantageously requires much time and effort to newly develop TTS systems or to maintain existing TTS systems. Further, according to Document 1, syntactic analysis requiring a large number of calculations is unavoidable. Consequently, this technique is disadvantageously difficult to apply to a built-in system with a relatively low computation capacity.

BRIEF SUMMARY OF THE INVENTION

According to an embodiment of the present invention, a prosodic control rule generation method includes: dividing an input text into language units; estimating a punctuation mark incidence at a boundary between language units in the input text, the punctuation mark incidence indicating a degree that a punctuation mark occurs at the boundary, based on attribute information items of a plurality of language units adjacent to the boundary; and generating a prosodic control rule for speech synthesis including a condition for the punctuation mark incidence based on a plurality of learning data items each concerning prosody and including the punctuation mark incidence.

According to another embodiment of the present invention, a speech synthesis method includes: dividing an input text into language units; estimating a punctuation mark incidence at a boundary between language units in the input text, the punctuation mark incidence indicating a degree that a punctuation mark occurs at the boundary, based on attribute information items of a plurality of language units adjacent to the boundary; selecting a prosodic control rule for speech synthesis based on the punctuation mark incidence; and synthesizing a speech corresponding to the input text using the selected prosodic control rule.

BRIEF DESCRIPTION OF THE SEVERAL VIEWS OF THE DRAWING

FIG. 2 is a diagram illustrating information stored in a punctuation mark incidence database;

FIG. 3 is a diagram illustrating information stored in the punctuation mark incidence database;

DETAILED DESCRIPTION OF THE INVENTION

Embodiments of the present invention will be described below with reference to the drawings.

First Embodiment

Figure 1:
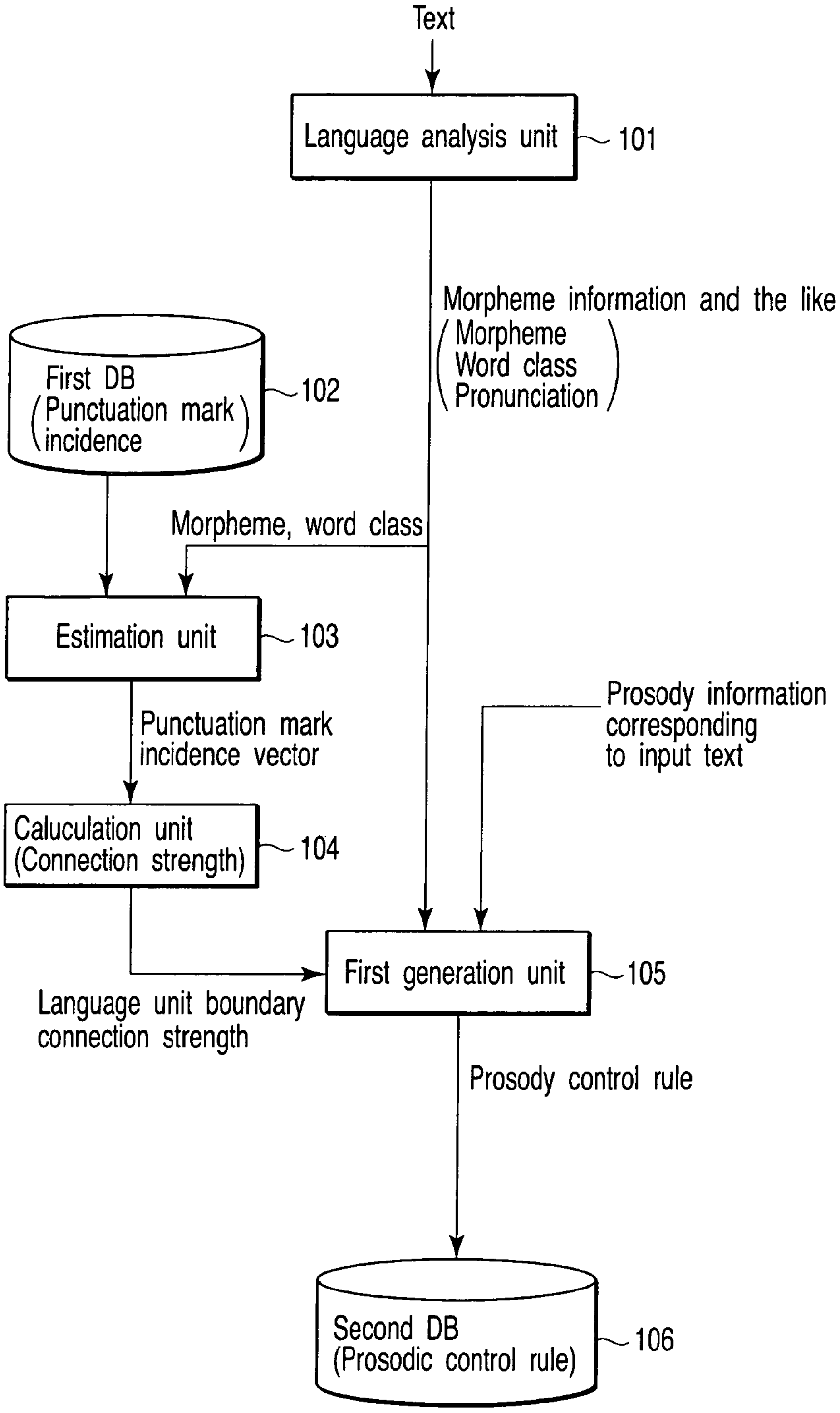
FIG. 1 is a diagram showing the exemplary configuration of a prosodic control rule generation apparatus according to a first embodiment.

FIG. 1 is a block diagram showing the exemplary configuration of a prosodic control rule generation apparatus for speech synthesis according to a first embodiment of the present invention.

The prosodic control rule generation apparatus in FIG. 1 includes a language analysis unit 101, a first database (punctuation mark incidence database) 102, an estimation unit 103, a calculation unit 104, a first generation unit 105, a second database (prosodic control rule database) 106.

Allowing a computer to execute appropriate programs enables the implementation of functions of the language analysis unit 101, estimation unit 103, calculation unit 104, and first generation unit 105.

The prosodic control rule generation apparatus uses and implements an appropriate language unit depending on the type of a natural language. For example, for Chinese, the language unit may be a character or word. For Japanese, the language unit may be a morpheme or kana. In the description below, the target language is Japanese and the language unit is a morpheme.

A text (reading text) corresponding to a speech stored in a speech database (not shown) is input to the language analysis unit 101. The language analysis unit 101 executes language analysis processing against the input text to divide it into language units (for example, in this case, morphemes). The language analysis unit 101 also outputs information (morpheme information) including the word class and pronunciation of each morpheme.

The first database (DB) 102 prestores, for each word class sequence including arbitrary two of all the word classes, the degree to which a punctuation mark occurs immediately before, between, and immediately after the two word classes, that is, a punctuation mark incidence.

The estimation unit 103 determines the punctuation mark incidence between (boundary between) two consecutive morphemes in a morpheme sequence which obtains by the language analysis executed on the input text by the language analysis unit 101 and which corresponds to the input text. Specifically, as the punctuation mark incidence between two consecutive morphemes of the "j−1"- and "j"-th morphemes from the leading one in the input text, that is, as the punctuation mark incidence at the morpheme boundary immediately before the "j"-th morpheme, "I+1" punctuation mark incidences are determined as shown below. Here, "I" denotes an arbitrary positive integer equal to or larger than "1".

(1) The punctuation mark incidence $P_0(v^{(j)})$ at the morpheme boundary immediately before the "j"-th morpheme, in a morpheme sequence $v^{(j)}$ composed of I morphemes starting with the "j"-th morpheme. This is defined as a first punctuation mark incidence $P_0(v^{(j)})$.

(2) The punctuation mark incidence $P_1(v^{(j-1)})$ at the morpheme boundary immediately before the "j"-th morpheme, in a morpheme sequence $v^{(j-1)}$ composed of I morphemes starting with the "j−1"-th morpheme. This is defined as a second punctuation mark incidence $P_1(v^{(j-1)})$.

(3) The punctuation mark incidence $P_1(v^{(j-I)})$ at the morpheme boundary between the morpheme sequence $v^{(j-I)}$ composed of I morphemes starting with the "j−I"-th morpheme and the "j"-th morpheme. This is defined as "I+1" punctuation mark incidences $P_1(v^{(j-I)})$.

The estimation unit 103 outputs punctuation mark incidence vectors $(P_0(v^{(j)}), P_1(v^{(j-1)}), \ldots, P_I(v^{(j-I)}))$ including "I+1" punctuation mark incidences of first to "I+1"-th punctuation mark incidences.

For example, it is assumed that I=2. The estimation unit 103 retrieves first to third punctuation mark incidences shown below from the first database 102, as the punctuation mark incidences between two consecutive morphemes of the "j−1"- and "j"-th morphemes.

(1) The punctuation mark incidence immediately before the morpheme sequence $v^{(j)}$ consisting of the "j"-th morpheme and the succeeding "j+1"-th morpheme. This is defined as a first punctuation mark incidence $P_0(v^{(j)})$.

(2) The punctuation mark incidence between the "j−1"-th morpheme and succeeding "j"-th morpheme of the morpheme sequence $v^{(j-1)}$ consisting of the "j−1"- and the "j"-th morphemes. This is defined as a second punctuation mark incidence $P_1(v^{(j-1)})$.

(3) The punctuation mark incidence immediately after a morpheme sequence $v^{(j-2)}$ consisting of the "j−2"-th morpheme and the succeeding "j−1"-th morpheme. This is defined as a third punctuation mark incidence $P_2v^{(j-2)})$.

The estimation unit 103 outputs, for every two consecutive morphemes in the input text, the punctuation mark incidence vector $(P_0(v^{(j)}), P_1(v^{(j-1)}), P_2(v^{(j-2)}))$ consisting of the first to third punctuation mark incidences as the punctuation mark incidences between the two consecutive morphemes.

The calculation unit 104 calculates the connection strength of every two consecutive morphemes in the input text, from the punctuation mark incidence vector for the two consecutive morphemes. The connection strength between language units (in this case, morphemes) is the weighted average of the first to I-th punctuation mark incidences, that is, the degree to which a punctuation mark occurs between the language units, namely, the punctuation mark incidence between the language units.

Prosody information corresponding to the input text, the connection strengths each calculated every two consecutive morphemes in the input text by the calculation unit 104, the word class and pronunciation of each morpheme, and the like are input to the first generation unit 105. The first generation unit 105 generates, for every two morphemes, control rule for prosody or a prosodic control rule based on the word class of each of the two morphemes, the connection strength between the two morphemes, and the like.

The prosodic control rules generated by the first generation unit 105 are stored in the second database 106.

The term "punctuation mark" as used in the specification has a broad meaning; it is not limited to a pause mark (「、」) and kuten (「。」) used in Japanese, but corresponds to the punctuation mark in English and includes parentheses and a quotation mark.

For the generation unit 105, the prosody information corresponding to the input text is obtained from natural speeches beforehand by having a person read the input text. The prosody information includes, for example, a fundamental frequency (pitch), a pitch pattern (F0 pattern) indicative of a variation in the level of a voice, a phoneme duration, and a pause position. The prosody information is obtained from each speech stored in the speech database.

The first DB 102 stores, for each word class sequence, a punctuation mark incidence $P_i(u)$ at each of the three word class boundaries in the word class sequence, that is, a punctuation mark incidence preceding the word class sequence, a punctuation mark incidence in the center of the word class sequence (between the two word classes constituting the word class sequence), and a punctuation mark incidence succeeding the word class sequence.

For example, as shown in FIG. 2, for a word class sequence (adverb and indeclinable word) consisting of an "adverb" and a "indeclinable word", the first DB 102 stores a punctuation mark incidence $P_0$ (adverb, indeclinable word) which is a punctuation mark incidence preceding the word class sequence, a punctuation mark incidence $P_1$ (adverb, indeclinable word) which is a punctuation mark incidence between the "adverb" and the "indeclinable word", and a punctuation mark incidence $P_2$ (adverb, substantive) which is a punctuation mark incidence succeeding the word class sequence; the punctuation mark incidences are indexed with the word classes in the word class sequence.

The three punctuation mark incidences for the word class sequence are calculated from a large number of texts prestored in a text database (not shown), using:

$$P_i(u) = -\log\frac{C_{punc}(u, i)}{C(u)} \tag{1}$$

where u denotes a sequence of language units, in this case, for example, a word class sequence $(u_1, u_2)$ consisting of two word classes. The length I of the word class sequence is 2 because the word class sequence consists of the two word classes. The two word classes included in the word class sequence are represented using appropriate ones of the numbers "1" to I: $u_1$ and $u_2$.

The variable "i" in the expression (1) denotes the positions of word class boundaries in the word class sequence, that is, a position preceding the word class sequence, a position in the center of the word class sequence (between the two word classes included in the word class sequence), and a position succeeding the word class sequence. Accordingly, i takes a value between "0" and I. Specifically, for I=2, i takes the value of "0", "1", or "2".

For example, the 0-th word class boundary (i=0) in a word class sequence u consisting of two word classes precedes the word class sequence. The punctuation mark incidence of the 0-th word class boundary is denoted as $P_0(u)$. The first word class boundary (i=1) in the word class sequence u is located between the two word classes. The punctuation mark incidence of the first word class boundary is denoted as $P_1(u)$. The second word class boundary (i=2) in the word class sequence u succeeds the word class sequence. The punctuation mark incidence of the second word class boundary is denoted as $P_2(u)$.

The C(u) in the expression (1) denotes the number of times the word class sequence u is observed in the texts in the text database.

The $C_{punc}(u,i)$ in the expression (1) denotes the number of times the word class sequence u with the punctuation mark placed at the i-th word class boundary is observed in the texts in the text database.

For convenience of applications, the punctuation mark incidence takes a positive logarithm value on a natural axis. Accordingly, the punctuation mark incidence $P_i(u)$ means that a smaller value indicates a higher degree (probability) to which the punctuation mark occurs at a punctuation mark incidence position.

The first DB 102 stores, for example, $P_0$ (adverb, indeclinable word)=45.2 as the 0-th punctuation mark incidence of a word class sequence (adverb, indeclinable word) consisting of an adverb and a indeclinable word, $P_1$ (subjective post-positional particle, adverb)=26.2 as the first punctuation mark incidence of a word class sequence (subjective post-positional particle, adverb) consisting of a subjective post-positional particle and an adverb, and $P_2$ (indeclinable word, subjective post-positional particle)=15.0 as the second punctuation mark incidence of a word class sequence (indeclinable word, subjective post-positional particle) as shown in FIG. 3.

Figure 4:
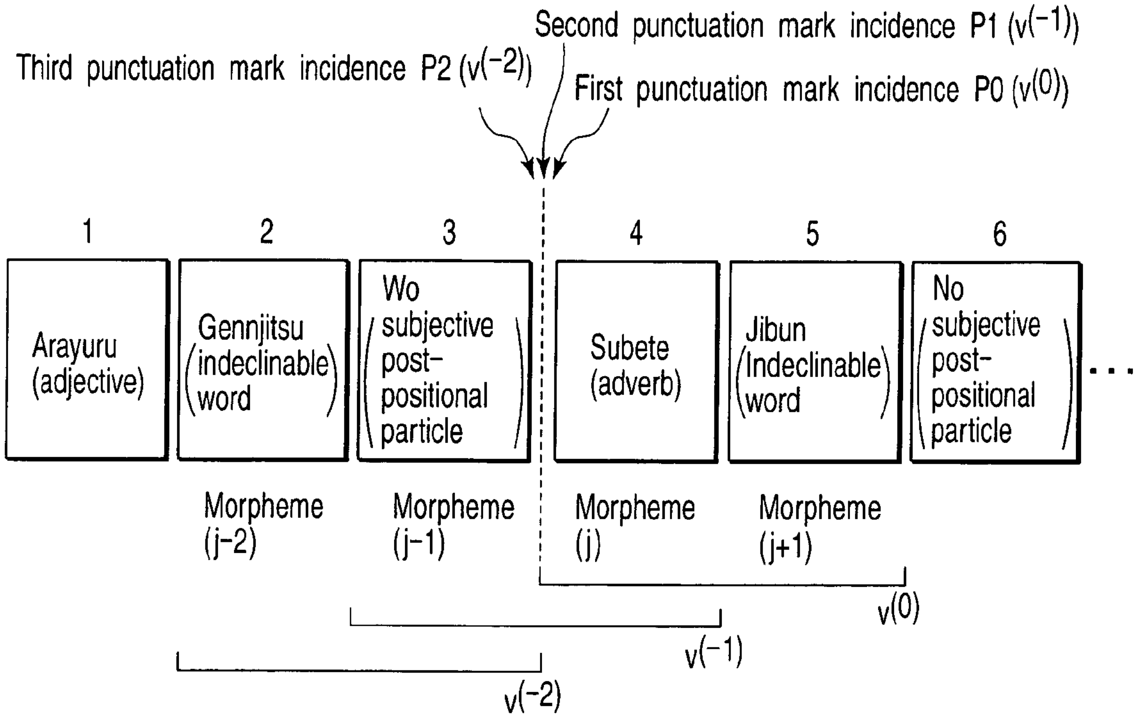
FIG. 4 is a diagram illustrating a punctuation mark incidence determined by a estimation unit.

For I=2, the estimation unit 103 retrieves, as the punctuation mark incidence between two consecutive morphemes, the "j−1"- and "j"-th morphemes from the leading one in the input text, the first to third punctuation mark incidences from the first DB 102 on the basis of the attribute (for example, in this case, word class) of (related) morphemes in the vicinity of the boundary between the two consecutive morphemes, as shown in FIG. 4.

Here, the language unit is a morpheme, but in this case, the punctuation mark incidence is estimated using, for example, the word class as the attribute of the language unit. On the other hand, if one character, which is smaller than the morpheme, is used as a language unit, the punctuation mark incidence is estimated using the character index as the attribute of the language unit, in place of the word class.

(1) For a word class sequence u[1] consisting of the word classes of the "j"- and next "j+1"-th morphemes, a punctuation mark incidence $P_0(u[1])$ preceding the word class sequence is retrieved from the first DB 102. The retrieved punctuation mark incidence $P_0(u[1])$ is the first punctuation mark incidence $P_0(V^{(j)})$ between the two consecutive morphemes, the "j−1"- and "j"-th morphemes.

(2) For a word class sequence u[2] consisting of the word classes of the "j−1"- and next "j"-th morphemes, a punctuation mark incidence $P_1(u[2])$ between the two word classes is retrieved from the first DB 102. The retrieved punctuation mark incidence $P_1(u[2])$ is the second punctuation mark incidence $P_1(V^{(j-1)})$ between the two consecutive morphemes, the "j−1"- and "j"-th morphemes.

(3) For a word class sequence u[3] consisting of the word classes of the "j−2"- and next "j−1"-th morphemes, a punctuation mark incidence $P_2(u[3])$ succeeding the word class sequence is retrieved from the first DB 102. The retrieved punctuation mark incidence $P_2(u[3])$ is the third punctuation mark incidence $P_2(V^{(j-2)})$ between the two consecutive morphemes, the "j−1"- and "j"-th morphemes.

In the present embodiment, the estimation unit 103 uses the word classes of the morphemes to search the first DB 102. For every two consecutive morphemes in the input text, the estimation unit 103 thus determines the three types of punctuation mark incidences between the two morphemes. However, the present invention is not limited to this. For example, a text in the text database (not shown) and expression (1) may be used to calculate punctuation mark incidences for a desired word class sequence to determine, for every two consecutive morphemes in the input text, the three types of punctuation mark incidences between the two morphemes.

The calculation unit 103 uses the punctuation mark incidences $P_0(v^{(j)})$, $P_1(v^{(j-1)})$, . . . , $P_I(v^{(j-I)})$, determined by the estimation unit 103, for the boundary (morpheme boundary preceding the "j"-th morpheme) between two consecutive morphemes in the input text, that is, the "j−1"- and "j"-th morphemes. The calculation unit 103 thus calculates the connection strength $D_j$ of the morpheme boundary preceding the "j"-th morpheme using:

$$D_j = \sum_{k=0}^{I} a_k(v^{(j-k)}) \tag{2}$$

where $a_0, a_1, \ldots, a_I$ are linear coefficients corresponding to the first to I-th punctuation mark incidences.

For example, for I=2, the first to third punctuation mark incidences (punctuation mark incidence vectors ($P_0(v^{(0)})$, $P_1(v^{(-1)})$, and $P_2(v^{(-2)})$ are obtained as described above. These are used to calculate the connection strength $D_j$ of the morpheme boundary preceding the "j"-th morpheme using expression (2). In this case, the connection strength $D_j$ of the morpheme boundary preceding the "j"-th morpheme can be calculated using:

$$D_j=a_0P_0(V^{(j)})+a_1P_1(V^{(j-1)})+a_2P_2(V^{(j-2)}) \tag{3}$$

where $a_0$, $a_1$, and $a_2$ are linear coefficients corresponding to the first to third punctuation mark incidences. It is possible that $a_0=a_1=a_2=1/3$, or values may be used which are optimized so as to exhibit the best performance.

A larger value of the connection strength $D_j$ corresponds to a lower degree to which the punctuation mark occurs between the "j−1"-th morpheme and the "j"-th morpheme, that is, a higher connection strength between the "j−1"-th morpheme and the "j"-th morpheme.

On the basis of the connection strength of the morpheme boundary and other morpheme information, the first generation unit 105 uses, for example, a machine learning tool c4.5 to analyze pitch pattern information and pause information to generate pitch pattern selection rules or pause estimation rules. The machine learning method may be implemented using a regression tree tool CART or a neural network.

Now, a specific description will be given of the procedure by which the prosodic control rule generation apparatus generates prosodic control rules. In this example, the text "arayuru/gennjitsu/wo/subete/jibun/no/hou/he/nejimageta/no/da" (which is Japanese and means that all the realities were self-servingly twisted) is input to the language analysis unit 101. Description will be given with reference to the flowchart shown in FIG. 5.

In the description below, I=2.

The text is input to the language analysis unit 101 (step S1). The language analysis unit 101 then divides the text into the morphemes "arayuru", "gennjit", "wo", "subete", "jibun", "no", "hou", "he", "nejimageta", "no", and "da". The language analysis unit 101 outputs a word class such as an "adnominal phrase", an "indeclinable word", a "subjective post-positional particle", or an "adverb", a pronunciation, or accent type information for each morpheme (step S2).

In this case, for example, the initial value of j is set at "3" (step S3). The estimation unit 103 sequentially determines the first to third punctuation mark incidences for the morpheme boundary between each morpheme and the preceding morpheme, starting with the third morpheme from the leading one in the input text (step S4).

In this example, the first to third punctuation mark incidences are determined for the fourth (j=4) morpheme "subete" of the text and the preceding third (j−1=3) morpheme "wo".

The estimation unit 103 determines the first to third punctuation mark incidences, retrieved from the first DB 102, for the morpheme boundary between the third morpheme "wo" and fourth morpheme "subete" of the text, that is, the morpheme boundary preceding the fourth morpheme, as shown in FIG. 4.

(1) The punctuation mark incidence $P_0$ (adverb, indeclinable word) at the 0-th word class boundary (i=0) in the word class sequence u=(adverb, indeclinable word) is retrieved from the first DB 102 on the basis of the word classes "adverb" and "indeclinable word" of the fourth morpheme "subete" and fifth morpheme "jibun". The retrieved punctuation mark incidence $P_0$ (adverb, indeclinable word)=45.2 is the first punctuation mark incidence.

(2) The punctuation mark incidence $P_1$ (subjective post-positional particle, adverb) at the first word class boundary (i=1) in the word class sequence u=(subjective post-positional particle, adverb) is retrieved from the first DB 102 on the basis of the word classes "subjective post-positional particle" and "adverb" of the third morpheme "wo" and fourth morpheme "subete". The retrieved punctuation mark incidence $P_1$ (subjective post-positional particle, adverb)=26.2 is the second punctuation mark incidence.

(3) The punctuation mark incidence $P_2$ (indeclinable word, subjective post-positional particle) at the second word class boundary (i=2) in the word class sequence u=(indeclinable word, subjective post-positional particle) is retrieved from the first DB 102 on the basis of the word classes "indeclinable word" and "subjective post-positional particle" of the second morpheme "gennjitsu" and third morpheme "wo". The retrieved punctuation mark incidence $P_2$ (indeclinable word, subjective post-positional particle)=15.0 is the third punctuation mark incidence.

This results in a punctuation mark incidence vector (45.2, 26.2, 15.0).

Then, the calculation unit 104 substitutes the first to third punctuation mark incidences obtained by the estimation unit 103 into Equation (3). The calculation unit 104 thus calculates the connection strength $D_j$ of the morpheme boundary between the "j"-th morpheme and the preceding "j−1"-th morpheme (step S5).

Here, a connection strength $D_4$ is calculated by substituting the first to third punctuation mark incidences "45.2", "26.2" and "15.0", obtained for the morpheme boundary between the third morpheme "wo" and fourth morpheme "subete" of the text, into Equation (3).

In Equation (3), when $a_0=a_1=a_2=1/3$, the connection strength $D_4$ is the average of the first to third punctuation mark incidences. Then, in the above example, the connection strength $D_4$ is determined to be "28.8".

Then, the value j is incremented by one (step S6) to shift to processing for the next morpheme. If this morpheme is not the final one in the input text (step S7), steps S4 to S6, described above, are executed on the morpheme. If the morpheme is the final one in the input text ("yes" in step S7), the process proceeds to step S8. In step S8, if the input text is not the final unprocessed text in the speech database ("no" in step S8), a new unprocessed text in the speech database is input to the speech synthesis prosodic control rule generation apparatus. Steps S1 to S7, described above, are executed again on the new text. If the input text of the final one in the speech database ("yes" in step S8), the process is ended. The first generation unit 105 then executes processing (step S9).

Figure 5:
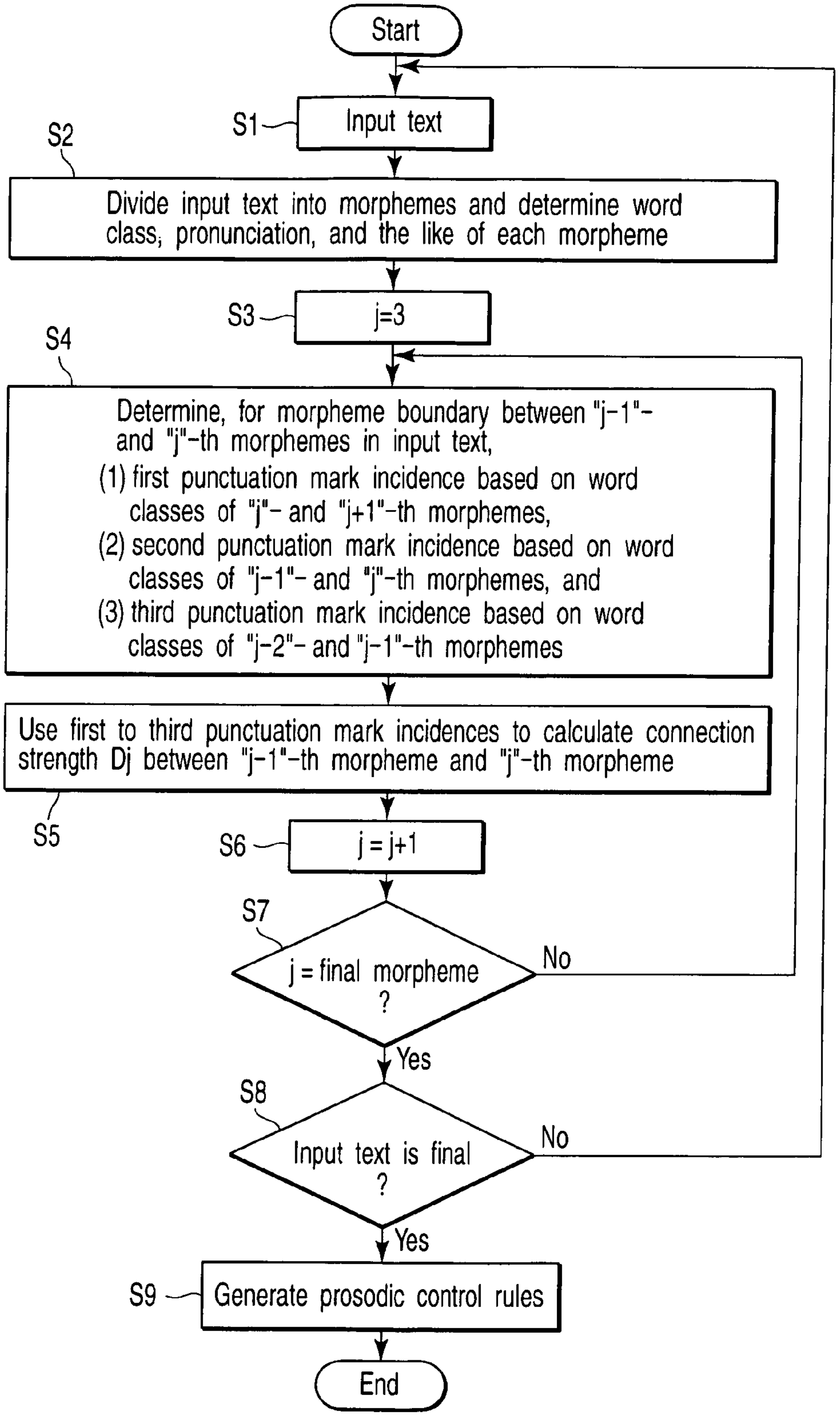
FIG. 5 is a flowchart illustrating process operations of the prosodic control rule generation apparatus in FIG. 1.

The first generation unit 105 generates prosodic control rules using the connection strengths between the morphemes and information on the morphemes such as their word classes and pronunciations, which have been calculated from all the texts in the speech database as shown in FIG. 5, as well as prosody information obtained from the texts in the speech database.

Examples will be shown below in which, for example, the machine learning program "C4.5", which generates a classification tree called a "decision tree", is used to generate prosodic control rules.

[Generation of Selection Rules for a fundamental Frequency Representative Pattern]

Fundamental frequency control schemes for Japanese speech synthesis include generate a fundamental frequency pattern for the entire sentence from a fundamental frequency representative pattern for each accent phrase as disclosed in, for example, JP-A 11-95783 (KOKAI). This scheme selects a fundamental frequency representative pattern for each accent phrase and transformation rules for the fundamental frequency representative pattern on the basis of the attribute of the accent phrase. The scheme then varies and connects together the fundamental frequency representative patterns for the accent phrases to output a fundamental frequency pattern for the entire sentence. Description will be given below of generation of representative pattern selection rules which can be utilized for this scheme.

Here, rules for selection of a representative pattern for N fundamental frequencies are generated from the contents of the speech database by a machine learning technique. It is assumed that optimum representative patterns for accent phrases included in each speech stored in the speech database are predetermined by an error minimization method or the like and that representative patterns obtained and their numbers are stored in the speech database.

As described above, the first generation unit 105 of the present embodiment uses a text stored in the speech database to create learning data items to be provided to the machine learning program using the connection strengths between morphemes calculated by the calculation unit 104, information on the accent phrases contained in the text, and the like.

Each learning data item includes input information that is attribute information on each accent phrase included in the text stored in the speech database, and output information that is the number of a representative pattern for a fundamental frequency corresponding to that accent phrase.

The input information in the learning data item includes connection strengths (calculated by the calculation unit 104) at boundaries preceding and succeeding each accent phrase (beginning and ending boundaries), as attribute information on that accent phrase.

For example, it is assumed that the attribute information contains connection strengths and word class information. Then, learning data item on a certain accent phrase includes the following information:

connection strength at the beginning boundary of the accent phrase;

connection strength at the ending boundary of the accent phrase;

major word class of the preceding accent phrase;

major word class of the present accent phrase;

major word class of the succeeding accent phrase; and a number of an optimum representative pattern corresponding to the accent phrase.

In the case of the input text "arayuru/gennjitsu/wo/subete/jibun/no/hou/he/nejimageta/no/da", used in the above description, the following learning data is generated for the accent phrase "subete".

"28.8; 36.2; Noun, Adverb, Noun; 2"

Here, "28.8" is a connection strength calculated for the boundary between "wo" and "subete". "36.2" is a connection strength calculated for the boundary between "subete" and "jibun". "noun", which succeeds "36.2", is the major word class of the preceding accent phrase "gennjitsuwo". The succeeding "adverb" is the major word class of the present accent phrase. The second "noun", which succeeds "adverb", is the major word class of the succeeding accent phrase "jibunno". The final "2" is the predetermined number of the optimum representative pattern for the fundamental frequency for the accent phrase "subete".

A large number of learning data items in this form is generated from all the data stored in the speech database and provided to the machine learning program C4.5. Learning by C4.5 results in representative pattern selection rules based on the large number of input learning data items; the selection rules allow the optimum representative pattern for a certain accent phrase to be selected and include conditions for the word classes and connection strengths for that accent phrase and the preceding and succeeding accent phases.

"If (major word class of the preceding accent phrase=noun)

and (major word class of the accent phrase=adverb) and (connection strength at the beginning boundary<30)

and (connection strength at the ending boundary>30)

then representative pattern number=2"

The representative selection rules are as follows: "For a present accent phrase with a major word class of "adverb", an accent phrase with a major word class of "noun" precedes the present accent phrase, and if the connection strength between the present and preceding accent phrases is less than "30" and the connection strength between the present and succeeding accent phrases is more than "30", the number of the optimum representative pattern corresponding to the present accent phrase is "2".

These representative pattern selection rules, generated by the first generation unit 105, are stored in the second DB 106.

Other prosodic control rules, for example, estimation rules for phoneme duration or pause insertion can be generated in the same manner as that in which representative pattern selection rules for a fundamental frequency are generated.

[Generation of Estimation Rules for Phoneme Duration]

Estimation rules for phoneme duration can be generated as described above by classifying the phoneme durations included in speeches stored in the speech database into several groups on the basis of the distribution characteristics of phoneme durations.

Here, the input information in learning data item on a certain phoneme includes at least a morpheme including the phoneme and the connection strengths between that morpheme and the preceding and succeeding morphemes of that morpheme. The output information in the learning data item includes the duration of the phoneme.

The first generation unit 105 uses the machine learning program C4.5 to extract phoneme duration estimation rules on the basis of a large number of such learning data items; the phoneme duration estimation rules allow the optimum phoneme duration for a certain phoneme to be selected and include conditions for the connection strengths and word classes for a morpheme including that phoneme and the preceding and succeeding morphemes.

[Generation of Estimation Rules for Pause Insertion]

To generate rules for estimating whether or not to insert a pause into a morpheme boundary, the input information in learning data item includes, for example, at least the connection strength between a certain morpheme and the preceding (or succeeding) morpheme. The output information in the learning data item includes information indicating whether or not a pause is present between that morpheme and the preceding (or succeeding) another morpheme.

The first generation unit 105 uses the machine learning program C4.5 to extract pause insertion estimation rules on the basis of a large number of such learning data items; the pause insertion estimation rules allow the determination of whether or not to insert a pause between a certain morpheme and the preceding (or succeeding) another morpheme and includes conditions for the connection strengths and word classes for a morpheme including that phoneme and the preceding and succeeding morphemes.

In the first embodiment as described above, the punctuation mark incidence at a language unit boundary (for example, the boundary between two morphemes) is obtained and the connection strength of the language unit boundary is calculated using the punctuation mark incidence obtained. Then, by machine learning prosodic control using learning data item including the language unit boundary connection strength, word class information, and the like, the prosodic control rules for the optimum prosodic control including conditions for the connection strength of the language unit boundary is generated.

Second Embodiment

Figure 6:
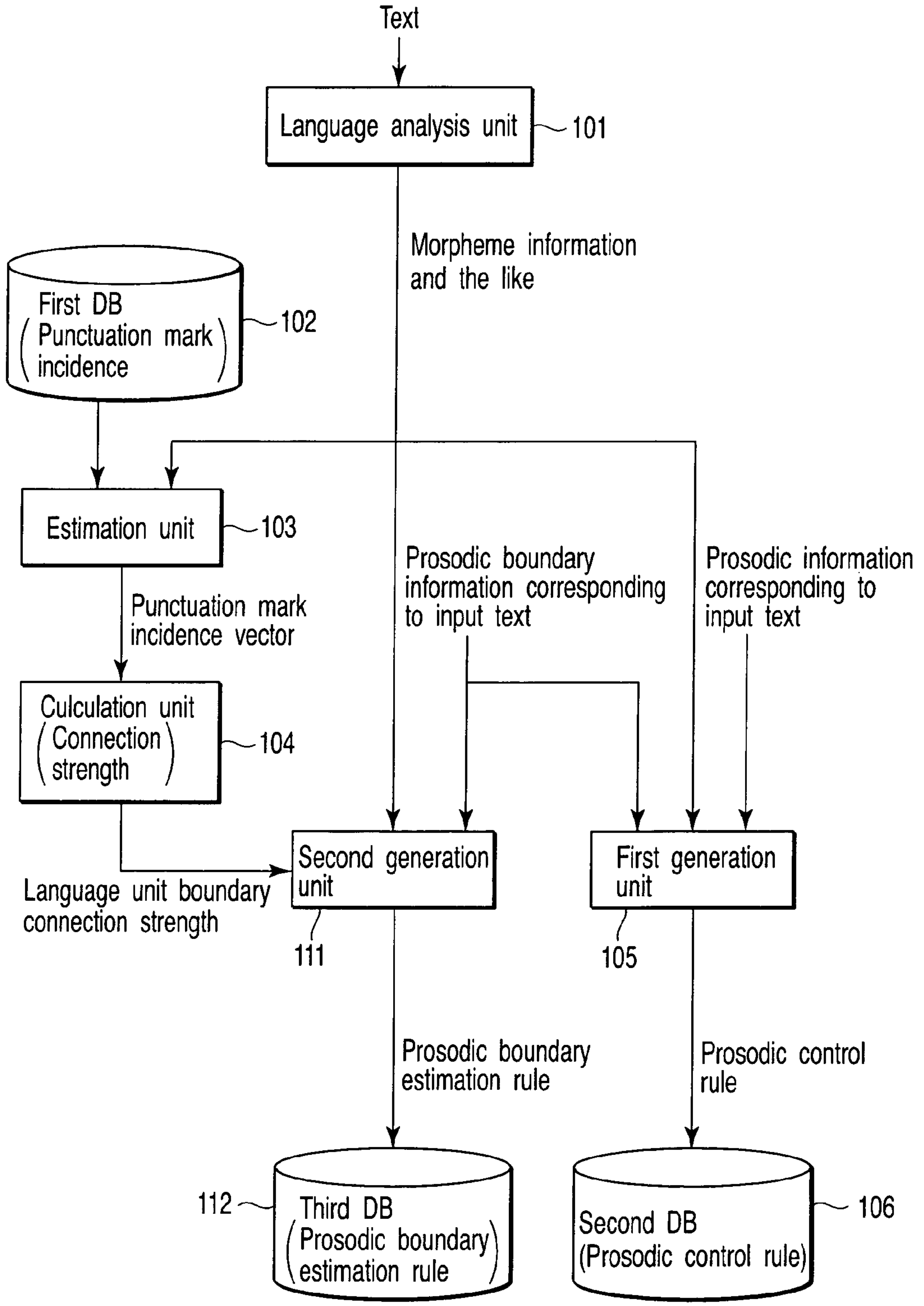
FIG. 6 is a diagram showing the exemplary configuration of a prosodic control rule generation apparatus according to a second embodiment.

FIG. 6 is a block diagram showing the exemplary configuration of a prosodic control rule generation apparatus for speech synthesis according to a second embodiment of the present invention.

The prosodic control rule generation apparatus uses and implements an appropriate language unit depending on the type of a natural language. For example, for Chinese, the language unit may be a character or word. For Japanese, the language unit may be a morpheme or kana. In the description below, the language of interest is Japanese and the language unit is a morpheme.

In FIG. 6, the same parts as those in FIG. 1 are denoted by the same reference numerals. Differences from FIG. 6 will be described. The prosodic control rule generation apparatus in FIG. 6 is different from that in FIG. 1 in that the former additionally includes a second generation unit 111 that uses the connection strength between morphemes, morpheme information, and the like to generate prosodic boundary estimation rules and a third database (third DB) 112 that stores the prosodic boundary estimation rules generated by the second generation unit 111. The prosodic control rule generation apparatus in FIG. 6 is also different from that in FIG. 1 in that the first generation unit 105 further uses prosodic boundary information to generate prosodic control rules.

The second generation unit 111 generates prosodic boundary estimation rules by using the machine learning program C4.5 to analyze prosodic boundary information stored in the speech database on the basis of the connection strengths between morphemes and morpheme information including the word classes of the morphemes, as well as other information. The prosodic boundary estimation rules generated are stored in the third DB 112.

The first generation unit 105 analyzes prosodic information such as fundamental frequency pattern information, phoneme duration information, and pause information on the basis of prosodic boundary information, morpheme information, and the like stored in the speech database to generate prosodic control rules. The prosodic boundary estimation rules generated are stored in the second DB 106.

The machine learning method, used by the second generation unit 111 and the first generation unit 105, may be implemented using a regression tree tool CART or a neural network.

Allowing a computer to execute appropriate programs enables the implementation of functions of the language analysis unit 101, the estimation unit 103, the calculation unit 104, the first generation unit 105, the second generation unit 111, and the like.

A specific description will be given mainly of the procedure for generating prosodic boundary estimation rules and prosodic control rules in the second generation unit 111 and the first generation unit 105 of the prosodic boundary estimation rule generation apparatus in FIG. 6.

In this example, the text "arayuru/gennjitsu/wo/subete/jibun/no/hou/he/nejimageta/no/da" is input to the language analysis unit 101.

First, the second generation unit 111 will be described.

The prosodic boundaries are classified into three types: prosodic word boundaries, prosodic phrase boundaries, and breath group boundaries. A prosodic word is composed one or more morphemes. A prosodic phrase is composed of one or more prosodic words. A breath group is composed of one or more prosodic phrases. The above input text contains the following five prosodic words:

"arayuru",
"gennjitsuwo",
"subete",
"jibunnohouhe", and
"nejimagetanoda".

The boundaries among these five prosodic words are called prosodic word boundaries. The text contains the following three prosodic phrases:

"arayurugennjitsuwo",
"subetejibunnohouhe", and
"nejimagetanoda".

The boundaries among the three prosodic phrases are called prosodic phrase boundaries. Since the prosodic phrase contains prosodic words, the prosodic phrase boundary always corresponds to a prosodic word boundary. Further, the text contains the following two breath groups:

"arayurugennjitsuwo", and
"subetejibunnohouhenejimagetanoda".

The boundary between these two breath groups is called a breath group boundary. Since the breath group contains prosodic phrases and prosodic words, the breath group boundary always corresponds to a prosodic phrase boundary or a prosodic word boundary.

The processing operation of the language analysis unit 101, the first DB 102, the estimation unit 103, and the calculation unit 104 are similar to those in the first embodiment (see the description of FIG. 5).

As shown in FIG. 5, the calculation unit 104 and language analysis unit 101 obtain the connection strengths between morphemes and morpheme information such as the word classes and pronunciations of the morphemes from all the texts stored in the speech database. The second generation unit 111, by using the above information, analyzes the prosodic word boundary information, prosodic phrase boundary information, and breath group boundary information obtained from the texts stored in the speech database to generate prosodic word boundary estimation rules, prosodic phrase boundary estimation rules, and breath group boundary estimation rules.

Here, the machine learning program C4.5, which generates a classification tree called a "decision tree", is used to generate prosodic word boundary estimation rules, prosodic phrase boundary estimation rules, and breath group boundary estimation rules.

[Generation of Prosodic Word Boundary Estimation Rules]

Here, estimation rules for determining whether or not a morpheme boundary preceding a certain morpheme is a prosodic word boundary are generated by a machine learning technique using information prestored in the speech database. Human subjective evaluations are used to determine whether or nor a morpheme boundary in a text stored in the speech database and corresponding to a speech is a prosodic word boundary. The speech database stores, for each morpheme boundary in each text, "1" if the morpheme boundary is a prosodic word boundary or "0" if it is not a prosodic word boundary.

The second generation unit 111 generates learning data items to be provided to the machine learning program. The learning data item includes input information that is attribute information on each morpheme included in each text stored in the speech database, and output information indicating whether or not the boundary between that morpheme and the preceding morpheme is a prosodic word boundary.

The input information in the learning data item contains the connection strength between the morpheme and the preceding morpheme as attribute information on this morpheme.

For example, it is assumed that the attribute information on a morpheme includes connection strength and word class information. Then, learning data item on a present morpheme includes the following information:

connection strength between the present morpheme and the preceding morpheme;

word class of the preceding morpheme;

word class of the present morpheme;

word class of the succeeding morpheme; and

"Yes" in the case where the boundary between the present morpheme and the preceding morpheme is a prosodic word boundary or "No" in the case where the boundary is not a prosodic word boundary.

For the input text "arayuru/gennjitsu/wo/subete/jibun/no/hou/he/nejimageta/no/da", the following learning data item can be generated.

"28.8; Noun, Adverb, Noun; Yes"

Here, "28.8" is a connection strength calculated for the boundary between "wo" and "subete". The first "noun", which succeeds "28.8", is the word class of "gennjitsuwo", a morpheme preceding the morpheme "subete". The succeeding "adverb" is the word class of the morpheme "subete". The succeeding second "noun" is the word class of "jibun", a morpheme succeeding the morpheme "subete". The final "Yes" indicates that in this case, the boundary preceding the morpheme "subete" is a prosodic word boundary.

A large number of learning data in this form is generated from all the data stored in the speech database and provided to the machine learning program C4.5. Learning by C4.5 results in, from the large number of input learning data, prosodic word boundary estimation rule which is for estimating whether the boundary between a certain morpheme and the preceding morpheme is a prosodic word boundary and includes conditions for the word classes and connection strengths for that morpheme and the preceding morpheme, is obtained. The prosodic word boundary estimation rules are, for example, as follows:

"If (major word class of the morpheme preceding the present morpheme=noun)

and (major word class of the present morpheme=adverb) and (connection strength between the present morpheme and the preceding morpheme<50)

then prosodic word boundary determination=Yes"

The prosodic word boundary estimation rule described above means: "A morpheme with a word class of "noun" precedes the present morpheme with a word class of "adverb", and if the connection strength between the "adverb" morpheme and the "noun" morpheme is less than "50", the boundary between the "adverb" morpheme and the preceding morpheme is a prosodic word boundary."

The prosodic boundary estimation rules generated by the second generation unit 111 are stored in the third DB 112.

Prosodic phrase boundary estimation rules can be generated in the same manner as that in which the prosodic word boundary estimation rules are generated.

[Generation of Prosodic Phrase Boundary Estimation Rules]

Here, estimation rules for determining whether or not a morpheme boundary preceding a certain morpheme is a prosodic phrase boundary are generated by a machine learning technique using information prestored in the speech database. The speech database stores, for each morpheme boundary in each text stored in the speech database and corresponding to a speech, a symbol indicating whether or not the morpheme boundary is a prosodic word boundary, and if it is a prosodic word boundary, whether or not the prosodic word boundary corresponds to a prosodic phrase boundary. For example, the speech database stores "0" if a certain morpheme boundary is not a prosodic word boundary, "1" if the morpheme boundary is a prosodic word boundary but not a prosodic phrase boundary, or "2" if the morpheme boundary is a prosodic word boundary and a prosodic phrase boundary.

The second generation unit 111 generates learning data item to be provided to the machine learning program. The learning data item includes input information that is attribute information on each morpheme included in each text stored in the speech database, and output information indicating whether or not the boundary between that morpheme and the preceding morpheme is a prosodic phrase boundary.

The input information in the learning data item includes the connection strength between the morpheme and the preceding morpheme as attribute information on this morpheme.

For example, it is assumed that the attribute information on a morpheme includes connection strength and word class information. Then, learning data item on a present morpheme includes the following information:

connection strength between the morpheme and the preceding morpheme;

word class of the preceding morpheme;

word class of the present morpheme;

word class of the succeeding morpheme; and

"Yes" in the case where the boundary between the present morpheme and the preceding morpheme is a prosodic phrase boundary or "No" in the case where the boundary is not a prosodic phrase boundary.

For the input text "arayuru/gennjitsu/wo/subete/jibun/no/hou/he/nejimageta/no/da", the following learning data item can be generated for the morpheme "subete".

"28.8; Noun, Adverb, Noun; Yes"

Here, "28.8" is a connection strength calculated for the boundary between "wo" and "subete". The first "noun", which succeeds "28.8", is the word class of "gennjitsuwo", a morpheme preceding the morpheme "subete". The succeeding "adverb" is the word class of the morpheme "subete". The succeeding second "noun" is the word class of "jibun", a morpheme succeeding the morpheme "subete". The final "Yes" indicates that in this case, the boundary preceding the morpheme "subete" is a prosodic phrase boundary.

A large number of learning data items in this form is generated from all the data stored in the speech database and provided to the machine learning program C4.5. Learning by C4.5 results in, from the large number of input learning data, prosodic phrase boundary estimation rule which is for estimating whether the boundary between a certain morpheme and the preceding morpheme is a prosodic phrase boundary and includes conditions for the word classes and connection strengths for that morpheme and the preceding morpheme, is obtained. The prosodic phrase boundary estimation rule of the present morpheme is, for example, as follows:

"If (major word class of the morpheme preceding the present morpheme=noun)

and (major word class of the present morpheme=adverb) and (connection strength between the present morpheme and the preceding morpheme<40)

then prosodic phrase boundary determination=Yes"

These prosodic phrase boundary estimation rules are stored in the third DB 112.

The prosodic phrase boundary estimation rule described above means: "A morpheme with a word class of "noun" precedes a morpheme with a word class of "adverb", and if the connection strength between the "adverb" morpheme and the "noun" morpheme is less than "40", the boundary between the "adverb" morpheme and the preceding morpheme is a prosodic phrase boundary."

Breath group boundary estimation rules can be generated in the same manner as that in which the prosodic word or phrase boundary estimation rules are generated.

[Generation of Breath Group Boundary Estimation Rules]

Here, estimation rules for determining whether or not a boundary preceding a certain prosodic phrase is a breath group boundary are generated by a machine learning technique using information prestored in the speech database. The speech database stores, for each morpheme boundary in each text stored in the speech database and corresponding to a speech, a symbol indicating whether or not the morpheme boundary is a prosodic word boundary, and if it is a prosodic word boundary, whether or not the prosodic word boundary corresponds to a prosodic phrase boundary. The speech database further stores a symbol indicating whether or not the prosodic phrase boundary corresponds to a breath group boundary. For example, the speech database stores "0" if a certain morpheme boundary is not a prosodic word boundary, "1" if the morpheme boundary is a prosodic word boundary but not a prosodic phrase boundary, "2" if the morpheme boundary is a prosodic word boundary and a prosodic phrase boundary, or "3" if the morpheme boundary is a prosodic word boundary and a prosodic phrase boundary and a breath group boundary.

The second generation unit 111 generates learning data items to be provided to the machine learning program. The learning data item included input information that is attribute information on each morpheme included in each text stored in the speech database, and output information indicating whether or not the boundary between that morpheme and the preceding morpheme is a breath group boundary.

The input information in the learning data item includes the connection strength between the morpheme and the preceding morpheme as attribute information on this morpheme.

For example, it is assumed that the attribute information on a morpheme contains a connection strength and word class information. Then, learning data item on a present morpheme includes the following information:

connection strength between the present morpheme and the preceding morpheme;

word class of the preceding morpheme;

word class of the present morpheme;

word class of the succeeding morpheme; and

"Yes" in the case where the boundary between the present morpheme and the preceding morpheme is a breath group boundary or "No" in the case where the boundary is not a breath group boundary.

For the input text "arayuru/gennjitsu/wo/subete/jibun/no/hou/he/nejimageta/no/da", the following learning data item can be generated for the morpheme "subete".

"28.8; Noun, Adverb, Noun; Yes"

Here, "28.8" is a connection strength calculated for the boundary between "wo" and "subete". The first "noun", which succeeds "28.8", is the word class of "gennjitsuwo", a morpheme preceding the morpheme "subete". The succeeding "adverb" is the word class of the morpheme "subete". The succeeding second "noun" is the word class of "jibun", a morpheme succeeding the morpheme "subete". The final "Yes" indicates that in this case, the boundary preceding the morpheme "subete" is a breath group boundary.

A large number of learning data items in this form is generated from all the data stored in the speech database and provided to the machine learning program C4.5. Learning by C4.5 results in, from the large number of input learning data, breath group boundary estimation rule which is for estimating whether the boundary between a certain morpheme and the preceding morpheme is a breath group boundary and includes conditions for the word classes and connection strengths for that morpheme and the preceding morpheme, is obtained.

The breath group boundary estimation rule of a present morpheme is, for example, as follows:

"If (major word class of the morpheme preceding the present morpheme=noun)

and (major word class of the present morpheme=adverb) and (connection strength between the present morpheme and the preceding morpheme<30)

then breath group boundary determination=Yes"

These breath group boundary estimation rules are stored in the third DB 112.

The breath group boundary estimation rule described above means: "A morpheme with a word class of "noun" precedes a morpheme with a word class of "adverb", and if the connection strength between the "adverb" morpheme and the "noun" morpheme is less than "30", the boundary between the "adverb" morpheme and the preceding morpheme is a breath group boundary."

Now, the first generation unit 105 will be described. In the description below, estimation rules for estimating a representative value for the phoneme duration are generated on the basis of prosodic boundary information.

On the basis of distribution of the durations of phonemes classified into consonants and vowels and contained in each speech stored in the speech database, the speech database stores up to D (D is an arbitrary positive integer) classified representative values for each morpheme. Here, by using the data stored in the speech database and the machine learning program C4.5, rules for estimating a representative value for the duration of each phoneme are generated on the basis of prosodic boundary information on the morpheme to which the phoneme belongs.

The first generation unit 105 generates learning data items to be provided to the machine learning program. For each phoneme included in each text stored in the speech database, the learning data item includes input information that is prosodic boundary information on the morpheme to which the phoneme belongs and output information that is a representative value for the duration of the phoneme.

The prosodic boundary information including the input information in learning data item of a present phoneme includes the following information:

type of the morpheme boundary between the morpheme including the present phoneme and the preceding morpheme (for example, one of a "breath group boundary", a "prosodic phrase boundary", a "prosodic word boundary", and a "general boundary" that means a boundary between the morphemes which is not the "breath group boundary", "prosodic phrase boundary", or "prosodic word boundary");

type of the morpheme boundary between the morpheme including the present phoneme and the succeeding morpheme (for example, one of a "breath group boundary", a "prosodic phrase boundary", a "prosodic word boundary", and a "general boundary");

number of moras between the present morpheme and the preceding breath group boundary;

number of moras between the present morpheme and the succeeding breath group boundary;

number of moras between the present morpheme and the preceding prosodic phrase boundary;

number of moras between the present morpheme and the succeeding prosodic phrase boundary;

number of moras between the present morpheme and the preceding prosodic word boundary; and number of moras between the present morpheme and the succeeding prosodic word boundary.

For the input text "arayuru/gennjitsu/wo/subete/jibun/no/hou/he/nejimageta/no/da", the learning data item shown below can be generated for the morpheme "wo".

"General Boundary; Breath Group Boundary, 8, 0, 8, 0, 4, 0, 300 ms"

Noted that the mora corresponds to kana (a character in Japanese), and a syllabic "n", a double consonant (a small "tsu"), a long "u", and the like in Japanese are each not counted as a syllable. For example, "gennjitsu" has three syllables and 4 moras.

Here, "general boundary" is the type of the prosodic boundary between "wo" and the preceding morpheme. "breath group boundary" is the type of the prosodic boundary between "wo" and the succeeding morpheme. The succeeding "8" is the number of moras between "wo" and the preceding breath group boundary, and for the above input text, the number of moras from the head of the sentence. The succeeding "0" is the number of moras between "wo" and the succeeding breath group boundary; for the above input text, this value is "0" because the boundary succeeding "wo" is a breath group boundary. The succeeding "8" is the number of moras between "wo" and the preceding prosodic phrase boundary, and for the above input text, the number of moras from the head of the sentence. The succeeding "0" is the number of moras between "wo" and the succeeding prosodic phrase boundary; for the above input text, this value is "0" because the boundary succeeding "wo" is a prosodic phrase boundary. The succeeding "4" is the number of moras between "wo" and the preceding prosodic word boundary; for the above input text, "gennjitsu" has four moras. The succeeding "0" is the number of moras between "wo" and the succeeding prosodic word boundary; for the above input text, this value is "0" because the boundary succeeding "wo" is a prosodic word boundary. The succeeding "300 ms" is a representative value for the duration of "wo".

A large number of learning data items in this form is generated from all the data stored in the speech database and provided to the machine learning program C4.5. Learning by C4.5 results in, from the large number of input learning data, a estimation rule which is for estimating a phoneme duration representative-value of a certain phoneme and includes conditions such as the type of the prosodic boundary between the morpheme including the phoneme and the preceding/succeeding morpheme and the numbers of moras between that morpheme and the preceding/succeeding breath group boundary/prosodic phrase boundary/prosodic word boundary which are for determining the duration of the phoneme. For example, the phoneme duration representative-value estimation rule shown below are obtained for the present phoneme "wo".

"If (type of the prosodic boundary between the morpheme including the present phoneme and the preceding morpheme=general boundary)

and (type of the prosodic boundary between the morpheme including the present phoneme and the succeeding morpheme=breath group boundary)

and (number of moras between the present phoneme and the preceding breath group boundary<10)

and (number of moras between the present phoneme and the preceding prosodic phrase boundary>6)

and (number of moras between the present phoneme and the succeeding breath group boundary=0)

and (number of moras between the present phoneme and the preceding prosodic word boundary>2)

then representative value for the duration=300 ms

These phoneme duration representative value estimation rules are stored in the second DB 106.

Thus, according to the second embodiment, the punctuation mark incidence of a language unit boundary is estimated, and the connection strength of the language unit boundary is calculated. Then, based on the connection strength, word class information, and the like, the prosodic boundary estimation rule which is for determining whether or not the boundary between a certain morpheme and the preceding another morpheme is a prosodic word boundary/prosodic phrase boundary/breath group boundary and includes conditions for the word classes and connection strengths for that morpheme and the preceding morpheme can be generated.

Also, according to the second embodiment, based on the type of the prosodic boundary between morphemes (for example, a "breath group boundary", a "prosodic phrase boundary", a "prosodic word boundary", and a "general boundary" that means a simple boundary between the morphemes which is not the "breath group boundary", "prosodic phrase boundary", or "prosodic word boundary"), the connection strength between the morphemes, and the like, the prosodic control rule for speech synthesis including conditions for the type of the prosodic boundary between the morphemes and the number of moras preceding the prosodic boundary (breath group boundary, prosodic phrase boundary, prosodic word boundary, or the like).

Third Embodiment

Figure 7:
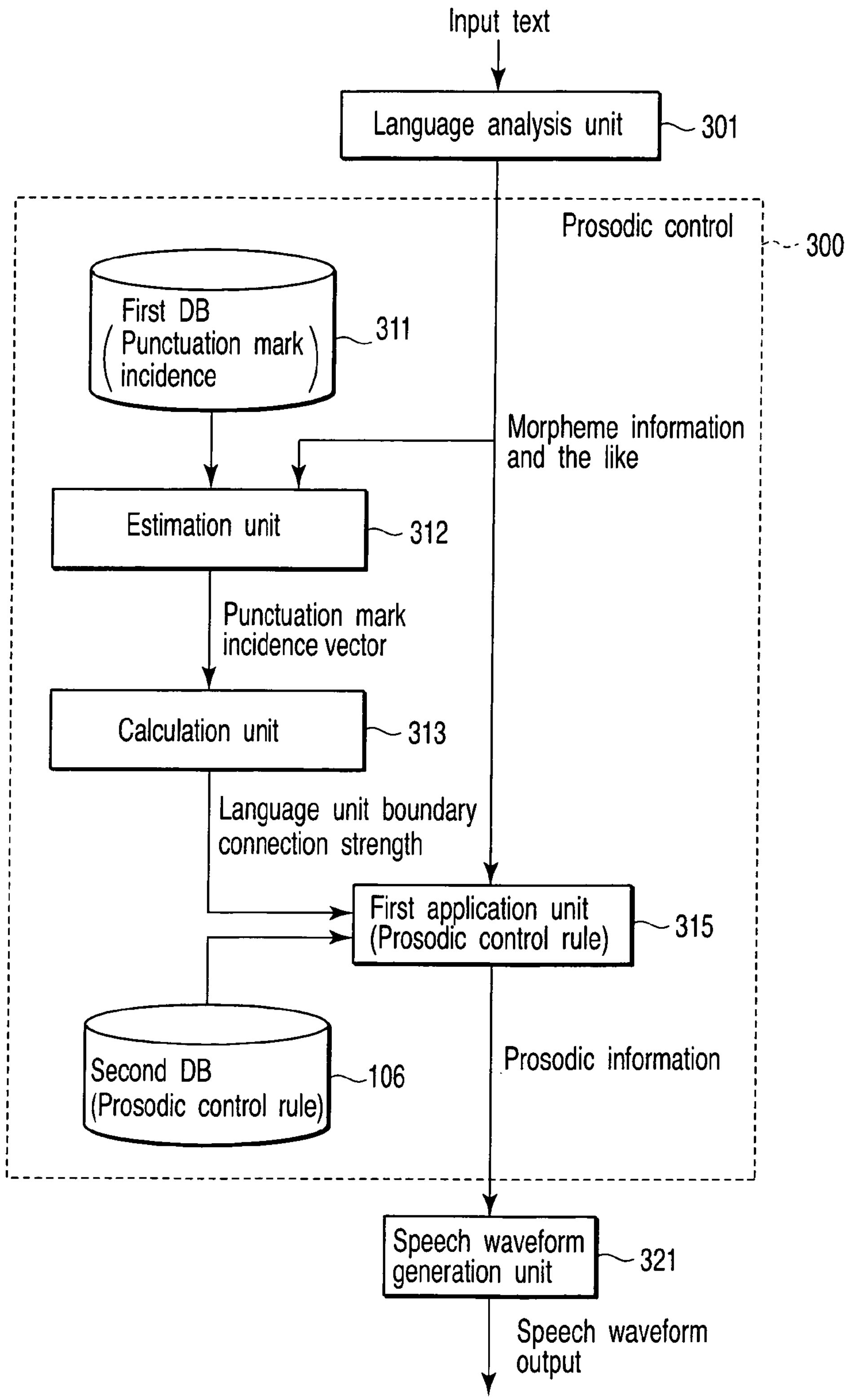
FIG. 7 is a block diagram showing the exemplary configuration of a speech synthesis apparatus according to a third embodiment.

FIG. 7 is a block diagram showing a speech synthesis apparatus according to a third embodiment of the present invention. This speech synthesis apparatus uses prosodic control rules generated by the prosodic control rule generation apparatus in FIG. 1 described in the first embodiment, to subject an input text to speech synthesis. Here, the language unit is a morpheme.

The speech synthesis apparatus according to the present invention is roughly composed of a language analysis unit 301, a prosodic control unit 300, and a speech wave-form generation unit 321.

A text is input to the language analysis unit 301, which then divides it into language units (for example, in this case, morphemes). The language analysis unit 301 also outputs morpheme information such as the word class and pronunciation of each morpheme.

The prosodic control unit 300 generates prosodic information using information such as the word class and pronunciation of each morpheme which has been output by the language analysis unit 301 as well as the prosodic control rules stored in the second DB 106 of the prosodic control rule generation apparatus in FIG. 1.

The speech-wave generation unit 321 uses the prosodic information and the pronunciation of the text to generate a waveform of a synthetic speech corresponding to the input text.

The prosodic control unit 300 is characteristic of the speech synthesis apparatus in FIG. 7. The prosodic control unit 300 includes the first DB 311, the estimation unit 312, the calculation unit 313, a first application unit 315, and the second DB 106.

Allowing a computer to execute appropriate programs enables the implementation of functions of the language analysis unit 301, the estimation unit 312, the calculation unit 313, the first application unit 315, speech wave-form generation unit 321, and the like.

Like the first DB 102 in FIG. 1, the first DB 311 prestores, for each word class sequence consisting of arbitrary two of all the word classes, the degree to which a punctuation mark occurs immediately before, between, and immediately after the two word classes, that is, a punctuation mark incidence.

Like the estimation unit 103 in FIG. 1, the estimation unit 312 determines the punctuation mark incidence between (boundary between) two consecutive morphemes in a morpheme sequence which results from the language analysis executed on the input text by the language analysis unit 301 and which corresponds to the input text. Specifically, "I+1" punctuation mark incidences are determined as shown below and are each the punctuation mark incidence between two consecutive morphemes, the "j−1"- and "j"-th morphemes from the leading one in the input text, that is, the punctuation mark incidence at the morpheme boundary preceding the "j"-th morpheme. Here, "I" denotes an arbitrary positive integer equal to or larger than "1".

(1) The punctuation mark incidence $P_0(v^{(j)})$ at the morpheme boundary preceding the "j"-th morpheme in the input text, in a morpheme sequence $v^{(j)}$ composed of I morphemes starting with the "j"-th morpheme. This is defined as a first punctuation mark incidence $P_0(v^{(j)})$.

(2) The punctuation mark incidence $P_1(v^{(j-1)})$ at the morpheme boundary preceding the "j"-th morpheme in the input text, in a morpheme sequence $v^{(j-1)}$ composed of I morphemes starting with the "j−1"-th morpheme. This is defined as a second punctuation mark incidence $P_1(v^{(j-1)})$.

(3) The punctuation mark incidence $P_1(v^{(j-I)})$ at the morpheme boundary preceding the "j"-th morpheme in the input text, in a morpheme sequence $v^{(j-I)}$ composed of I morphemes starting with the "j−I"th morpheme. This is defined as a "I"-th punctuation mark incidence $P_1(v^{(j-I)})$.

The estimation unit 312 outputs punctuation mark incidence vectors $(P_0(v^{(j)}), P_1(v^{(j-1)}), \ldots, P_I(v^{(j-I)})$ consisting of "I+1" punctuation mark incidences, the first to "I"-th punctuation mark incidences.

For example, it is assumed that I=2. The estimation unit 312 retrieves a first to third punctuation mark incidences shown below from the first DB 311, as the punctuation mark incidence between two consecutive morphemes, the "j−1"- and "j"-th morphemes.

(1) The punctuation mark incidence preceding the morpheme sequence $v^{(j)}$ consisting of the "j"-th morpheme and the succeeding "j+1"-th morpheme. This is defined as a first punctuation mark incidence $P_0(v^{(j)})$.

(2) The punctuation mark incidence between the "j−1"-th morpheme and succeeding "j"-th morpheme of the morpheme sequence $v^{(j-1)}$ consisting of the "j−1"- and the "j"-th morphemes. This is defined as a second punctuation mark incidence $P_1(v^{(j-1)})$.

(3) The punctuation mark incidence succeeding a morpheme sequence $v^{(j-2)}$ consisting of the "j−2"-th morpheme and the succeeding "j−1"-th morpheme. This is defined as a third punctuation mark incidence $P_2(v^{(j-2)})$.

The estimation unit 312 outputs, every two consecutive morphemes in the input text, punctuation mark incidence vectors $(P_0(v^{(j)}), P_1(v^{(j-1)}), P_2(v^{(j-2)})$ consisting of the first to third punctuation mark incidences.

Like the calculation unit 104 in FIG. 1, the calculation unit 313 calculates the connection strength of every two consecutive morphemes in the input text, from the punctuation mark incidence vector for the two consecutive morphemes.

The prosodic control rules generated by the prosodic control rule generation apparatus in FIG. 1 are stored in the second DB 106.

The first application unit 315 uses the morpheme information obtained by the language analysis unit 301 and the connection strength between morphemes obtained by the calculation unit 313, to select from the prosodic control rules stored in the second DB 106 to generate prosodic information.

Figure 8:
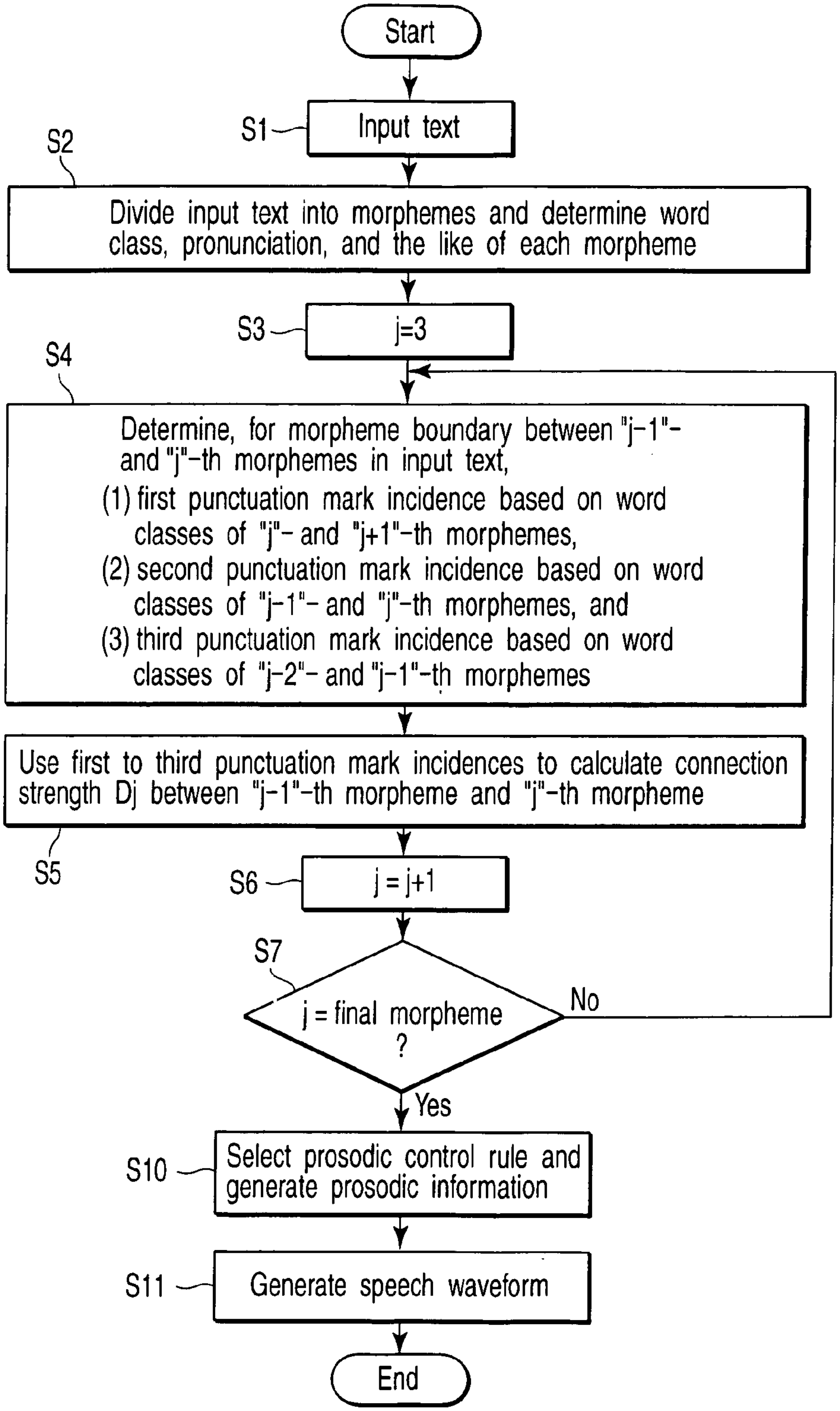
FIG. 8 is a flowchart illustrating process operations of the speech synthesis apparatus in FIG. 7.

FIG. 8 is a flowchart illustration process operations of the speech synthesis apparatus in FIG. 7. In FIG. 8, the same steps as those in FIG. 5 are denoted by the same reference numerals. Differences from FIG. 5 will be described below. That is, in FIG. 8, the process operations (steps S1 to S7) from the input of a text through the determination of the connection strength between morphemes are similar to those in FIG. 5.

The first application unit 315 uses the morpheme information and the connection strength between morphemes obtained from the input text by the processing from steps S1 to S7 to retrieve, from the second DB 106, one of the prosodic control rules whose condition matches the morpheme information and the connection strength between morphemes obtained. The first application unit 315 then uses the retrieved prosodic control rule to generate prosodic information (step S10).

The process proceeds to step S11, where the speech waveform generation unit 321 uses the prosodic information generated and the pronunciation of the text to generate a waveform of a synthetic speech corresponding to the input text.

Fourth Embodiment

Figure 9:
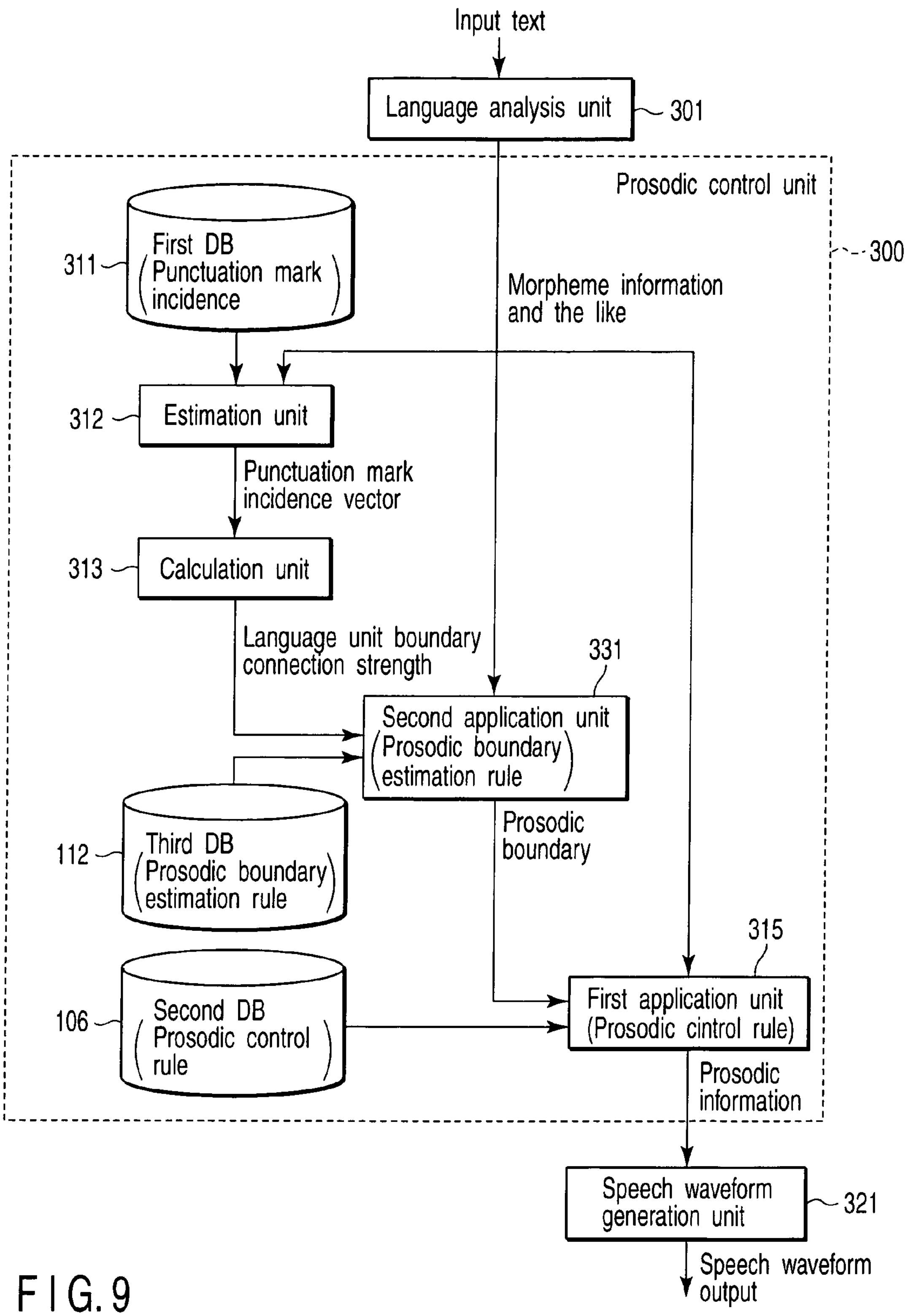
FIG. 9 is a block diagram showing the exemplary configuration of a speech synthesis apparatus according to a fourth embodiment.

FIG. 9 is a block diagram showing a speech synthesis apparatus according to a fourth embodiment of the present invention. This speech synthesis apparatus uses prosodic control rules generated by the prosodic control rule generation apparatus in FIG. 6 described in the second embodiment, to subject an input text to speech synthesis. Here, the language unit is a morpheme.

In FIG. 9, the same parts as those in FIG. 7 are denoted by the same reference numerals. Differences from FIG. 7 will be described below. That is, the speech synthesis apparatus in FIG. 9 additionally has a second application unit 331 and the third DB 112 in FIG. 6. The first application unit 315 uses the type of the prosodic boundary between morphemes determined by the second application unit 331, and the morpheme information obtained by the language analysis unit 301, and the like, to select the prosodic control rule from the second DB 106 and generate prosodic information.

Allowing a computer to execute appropriate programs enables the implementation of functions of the language analysis unit 301, the estimation unit 312, the calculation unit 313, the first application unit 315, the speech wave-form generation unit 321, the second application unit 331, and the like.

The third DB 112 stores prosodic boundary estimation rules generated by the prosodic control rule generation apparatus in FIG. 6. The second DB 106 stores prosodic control rules generated by the prosodic control rule generation apparatus in FIG. 6.

Figure 10:
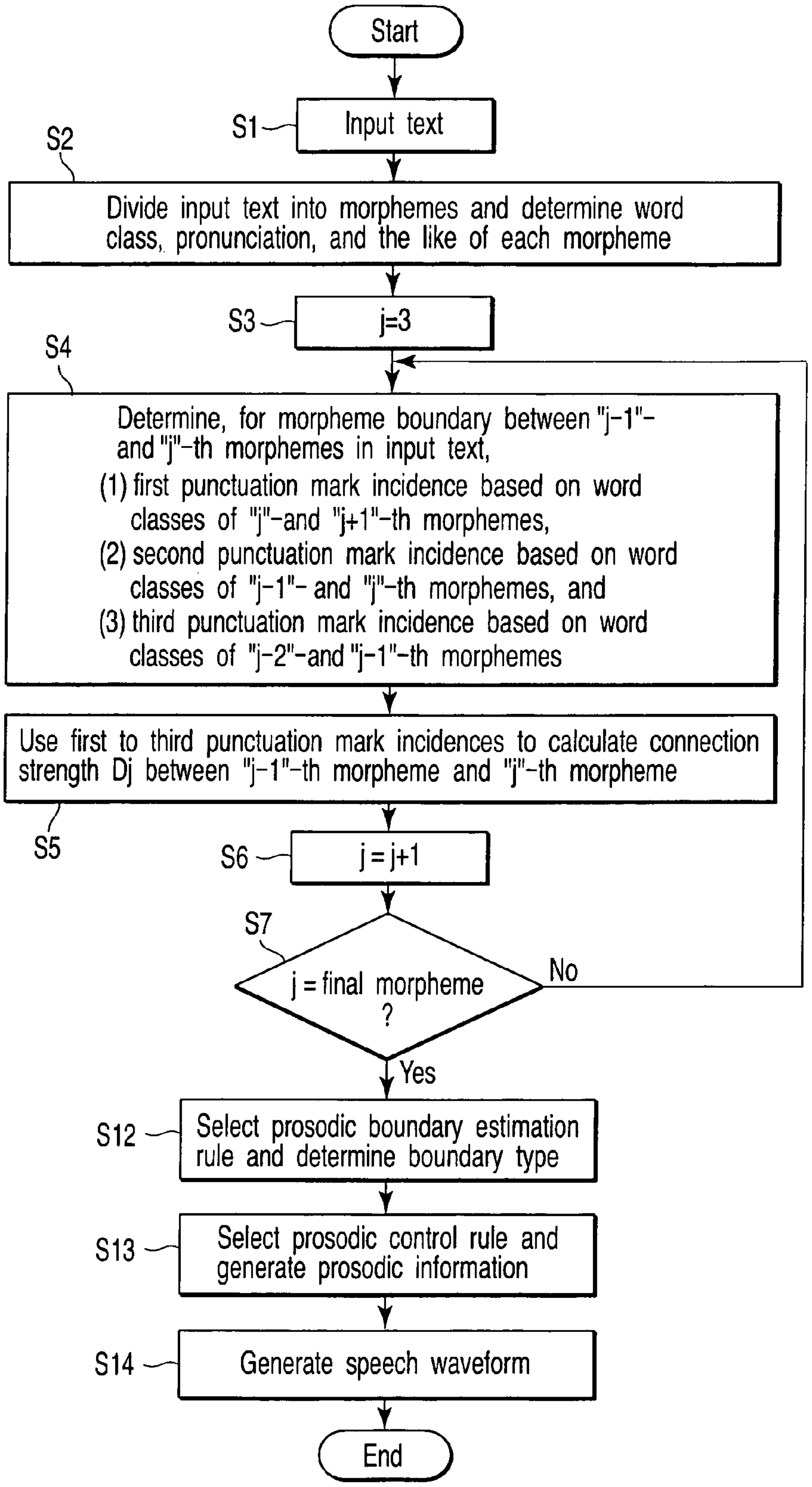
FIG. 10 is a flowchart illustrating process operations of the speech synthesis apparatus in FIG. 9.

FIG. 10 is a flowchart illustration processing operations of the speech synthesis apparatus in FIG. 9. In FIG. 10, the same steps as those in FIGS. 5 and 8 are denoted by the same reference numerals. Differences from FIGS. 5 and 8 will be described below. That is, in FIG. 10, the process operations (steps S1 to S7) from the input of a text through the determination of the connection strength between morphemes are similar to those in FIGS. 5 and 8.

The second application unit 331 uses the morpheme information and the connection strength between morphemes obtained from the input text by the processing from steps S1 to S7 to retrieve, from the third DB 112, one of the prosodic boundary estimation rules whose condition matches the morpheme information and the connection strength between morphemes obtained. The second application unit 331 then determines the type of the prosodic boundary of the morpheme boundary as the prosodic boundary (for example, a prosodic word boundary, prosodic phrase boundary, or breath group boundary) included in the retrieved prosodic boundary estimation rule (step S12).

The process proceeds to step S13. The first application unit 315 uses the morpheme information obtained by the language analysis unit 301 and the prosodic boundary determined by the second application unit 331 to retrieve, from the second DB 106, one of the prosodic control rules whose condition matches the morpheme information and prosodic boundary. The first application unit 315 then uses the retrieved prosodic control rule to generate prosodic information.

The process further proceeds to step S14, where the speech wave-form generation unit 321 uses the prosodic information generated and the pronunciation of the text to generate a waveform of a synthetic speech corresponding to the input text.

Fifth Embodiment

Figure 11:
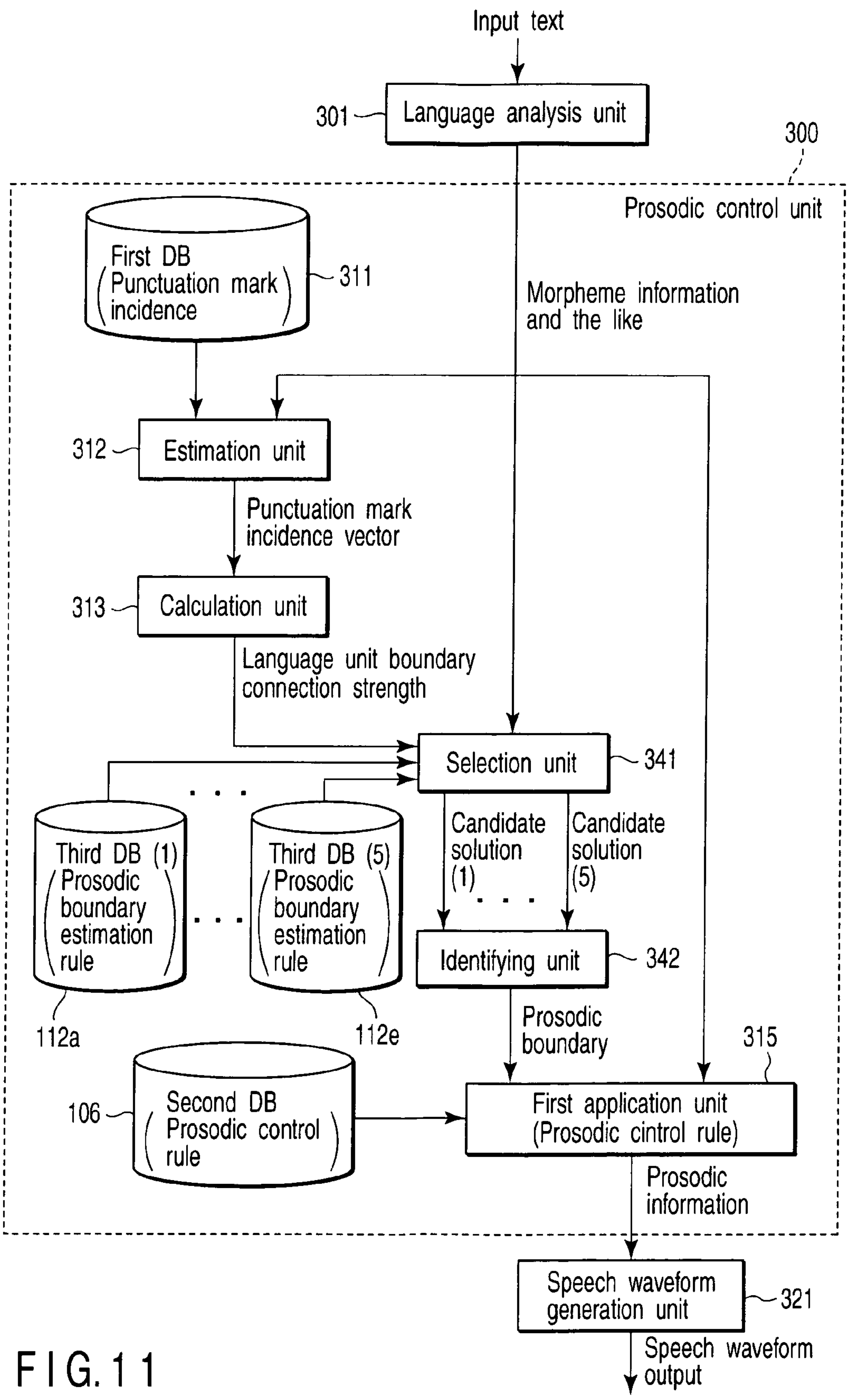
FIG. 11 is a block diagram showing the exemplary configuration of a speech synthesis apparatus according to a fifth embodiment.

FIG. 11 is a block diagram showing a speech synthesis apparatus according to a fifth embodiment of the present invention. In FIG. 11, the same parts as those in FIG. 9 are denoted by the same reference numerals. Also in the description below, the language unit is a morpheme.

The speech synthesis apparatus in FIG. 11 is different from that in FIG. 9 in that the type of the prosodic boundary is determined using a plurality of (for example, in this case, five) third DBs 112*a* to 112*e* generated by the prosodic control rule generation apparatus in FIG. 6 described in the second embodiment. The speech synthesis apparatus in FIG. 11 thus additionally has the plurality of (for example, in this case, five) third DBs 112*a* to 112*e*, a selection unit 341, and an identifying unit 342. Further, the processing in step S12 in FIG. 10 is different from the corresponding processing by the speech synthesis apparatus in FIG. 9.

Allowing a computer to execute appropriate programs enables the implementation of functions of the language analysis unit 301, the estimation unit 312, the calculation unit 313, the first application unit 315, the speech wave-form generation unit 321, the selection unit 341, the identifying unit 342, and the like.

The plurality of third DBs 112*a* to 112*e* store the respective prosodic boundary estimation rules generated by the prosodic boundary estimation rule generation apparatus in FIG. 6, for example, on the basis of prosodic boundary information in speech data from different persons. Each of the third DBs 112*a* to 112*e* stores prosodic boundary estimation rules of each of different persons.

In step S12, the selection unit 341 retrieves, from the plurality of third DBs 112*a* to 112*e*, prosodic boundary estimation rules whose conditions match the morpheme information and the connection strength between morphemes obtained from the input text match the conditions. The candidate solutions (1) is defined as a type of prosodic boundary (as a determination result) included in the prosodic boundary estimation rule retrieved from the third DB 112*a*. The candidate solutions (2) is defined as a type of prosodic boundary (as a determination result) included in the prosodic boundary estimation rule retrieved from the third DB 112*b*. The candidate solutions (3) is defined as a type of prosodic boundary (as a determination result) included in the prosodic boundary estimation rule retrieved from the third DB 112*c*. The candidate solutions (4) is defined as a type of prosodic boundary (as a determination result) included in the prosodic boundary estimation rule retrieved from the third DB 112*d*. The candidate solutions (4) is defined as a type of prosodic boundary (as a determination result) included in the prosodic boundary estimation rule retrieved from the third DB 112*e*. The type of the prosodic boundary is a prosodic word boundary, a prosodic phrase boundary, a breath group boundary, or a general boundary.

For example, the case that a present morpheme in the input text meet the condition shown below and the type of the prosodic boundary between the present morpheme and the preceding morpheme is estimated, is described below.

"(major word class of the morpheme preceding the present morpheme=noun)

and (major word class of the present morpheme=adverb) and (connection strength between the present morpheme and the preceding morpheme>25)"

The selection unit 341 retrieves a prosodic boundary estimation rule that matches the above conditions from each of the third DBs 112*a* to 112*e*.

It is assumed that a prosodic boundary estimation rule including a statement of "then" which indicates a "prosodic phrase boundary" as a determination result, is obtained from the third DBs 112*a*, 112*b*, and 112*c* (candidate solutions (1) to (3)) and that a prosodic boundary estimation rule including a statement of "then" which indicates a "prosodic word boundary" as a determination result, is obtained from the third DBs 112*d* and 112*e* (candidate solutions (4) to (5)).

The identifying unit 342 then determines the type of the prosodic boundary of the boundary from the candidate solutions (1) to (5), the number of the type of the prosodic boundary determined of the candidate solutions (1) to (5) is the largest and lager than a given number.

For example, in the above example, three candidate solutions indicate a "prosodic phrase boundary", and two candidate solutions indicate a "prosodic word boundary". Consequently, the boundary is determined to be a "prosodic phrase boundary" according to a majority decision rule.

Thus, once the type of the boundary between the morphemes is determined in step S12, the process proceeds to step S13. The first application unit 315 then uses the morpheme information obtained by the language analysis unit 301 and the prosodic boundary determined by the identifying unit 342 to retrieve, from the second DB 106, one of the prosodic control rules whose condition matches the morpheme information and prosodic boundary. The first application unit 315 then uses the retrieved prosodic control rule to generate prosodic information.

As described above, according to the first and second embodiments, by using punctuation mark incidence or language unit boundary connection strength determined from a large-scale text database, prosodic control rules are easily made by the machine learning technique using a small-size speech database. Also, the prosodic control rules that enable more natural prosody to be output can be generated without using syntactic analysis.

The punctuation mark incidences can be pre-calculated to generate a database. The speech synthesis apparatus according to the third to fifth embodiments, uses the prosodic control rules generated by the first and second embodiments to perform prosodic control for speech synthesis. This enables substantial reduction in the calculation amount required, thus may have applicability to a built-in system with a relatively low computation capacity.

According to the embodiments described above, there is provided a prosodic control rule generation method and apparatus that can easily generate prosodic control rules enabling synthetic speech similar to human speech to be generated, without syntactically analyzing texts, and a speech synthesis apparatus that can easily generate synthetic speech similar to human speech using prosaic control rules generated by the prosaic control rule generation method.

What is claimed is:

1. A computer implemented prosodic control rule generation method executed on a suitably programmed computer, the method including:

dividing an input text into language units;

estimating a punctuation mark incidence at a boundary between the language units, the punctuation mark incidence indicating a degree that a punctuation mark occurs at the boundary, based on attribute information items of a plurality of language units adjacent to the boundary; and generating, by the computer, a prosodic control rule for speech synthesis including a condition for the punctuation mark incidence based on a plurality of learning data items each concerning prosody and including the punctuation mark incidence.

2. The computer implemented prosodic control rule generation method according to claim 1, wherein each of the learning data items further includes a word class of each of the language units, and generating the prosodic control rule generates the prosodic control rule including conditions for the punctuation mark incidence between the language units and the word classes of the language units.

3. The computer implemented prosodic control rule generation method according to claim 1, wherein the estimating estimates the punctuation mark incidence at the boundary between a "j−1" (j is a positive integer)- and "j"-th language units from the beginning of the input text, based on each of "I+1" language unit sequences each including I language units starting with a "j−i" (i=0, 1, . . . , I, I is a positive integer equal to or larger than 1)-th language unit.

4. The computer implemented prosodic control rule generation method according to claim 3, wherein the punctuation mark incidence at the boundary between the "j−1"-th language unit and the "j"-th language unit is a weighted average of "I+1" punctuation mark incidences at the boundary between the "j−1"-th language unit and the "j"-th language unit, the "I+1" punctuation mark incidences each being estimated from an arrangement of word classes in respective "I+1" language unit sequences.

5. A computer implemented prosodic control rule generation method executed on a suitably programmed computer, the method including:

dividing an input text into language units;

estimating a punctuation mark incidence at a boundary between language units in the input text, the punctuation mark incidence indicating a degree that a punctuation mark occurs at the boundary, based on attribute information items of a plurality of language units adjacent to the boundary;

generating a plurality of learning data items each concerning prosodic boundary between the language units and including the punctuation mark incidence between the language units; and generating, by the computer, a prosodic boundary estimation rule for determining a type of a prosodic boundary and including a condition for the punctuation mark incidence between the language units based on the learning data items concerning prosodic boundary.

6. The computer implemented prosodic control rule generation method according to claim 5, wherein the type of the prosodic boundary is one of a prosodic word boundary, a prosodic phrase boundary, a breath group boundary, and a language unit boundary which is not the prosodic word boundary, the prosodic phrase boundary, or the breath group boundary.

7. The computer implemented prosodic control rule generation method according to claim 5, further including:

generating a plurality of learning data items each concerning prosody and including the type of the prosodic boundary between language units; and generating a prosodic control rule for speech synthesis including a condition for the type of the prosodic boundary based on the learning data items concerning prosody.

8. The computer implemented prosodic control rule generation method according to claim 5, wherein the estimating estimates the punctuation mark incidence at the boundary between a "j−1" (j is a positive integer)- and "j"-th language units from the beginning of the input text, based on each of "I+1" language unit sequences each including I language units starting with a "j−i" (i=0, 1, . . . , I, I is a positive integer equal to or larger than 1)-th language unit.

9. The computer implemented prosodic control rule generation method according to claim 8, wherein the punctuation mark incidence at the boundary between the "j−1"-th language unit and the "j"-th language unit is a weighted average of "I+1" punctuation mark incidences at the boundary between the "j−1"-th language unit and the "j"-th language unit, the "I+1" punctuation mark incidences each being estimated from an arrangement of word classes in respective "I+1" language unit sequences.

10. A computer implemented speech synthesis method executed on a suitably programmed computer, the method comprising:

dividing an input text into language units;

estimating a punctuation mark incidence at a boundary between language units in the input text, the punctuation mark incidence indicating a degree that a punctuation mark occurs at the boundary, based on attribute information items of a plurality of language units adjacent to the boundary;

selecting a prosodic control rule for speech synthesis based on the punctuation mark incidence; and synthesizing, by the computer, a speech corresponding to the input text using the selected prosodic control rule.

11. The computer implemented speech synthesis method according to claim 10, wherein the selecting selects, from a plurality of prosodic control rules for speech synthesis each including a condition for the punctuation mark incidence between the language units, the prosodic control rule whose condition meets the punctuation mark incidence between the language units estimated.

12. The computer implemented speech synthesis method according to claim 11, wherein the prosodic control rules are generated based on a plurality of learning data items each concerning prosody and including the punctuation mark incidence between language units.

13. A computer implemented speech synthesis method executed on a suitably programmed computer comprising:

dividing an input text into language units;

estimating a punctuation mark incidence at a boundary between language units in the input text, the punctuation mark incidence indicating a degree that a punctuation mark occurs at the boundary, based on attribute information items of a plurality of language units adjacent to the boundary;

determining a type of a prosodic boundary between the language units based on the punctuation mark incidence between the language units estimated;

selecting a prosodic control rule for speech synthesis based on the type of the prosodic boundary between the language units determined; and synthesizing, by the computer, a speech corresponding to the input text using the prosodic control rule selected.

14. The computer implemented speech synthesis method according to claim 13, wherein the determining the type includes: selecting, from a group of a plurality of prosodic boundary estimation rules each including a condition for the punctuation mark incidence between the language units in order to determine the type of the prosodic boundary between the language units, the prosodic boundary estimation rule whose condition meets the punctuation mark incidence between the language units estimated, and determining the type of the prosodic boundary between the language units types based on the prosodic boundary estimation rule selected.

15. The computer implemented speech synthesis method according to claim 14, wherein the prosodic boundary estimation rules are generated based on a plurality of learning data items each concerning the boundary between the language units and including the punctuation mark incidence between the language units.

16. The computer implemented speech synthesis method according to claim 13, wherein the selecting selects, from a plurality of prosodic control rules for speech synthesis each including a condition for a type of the prosodic boundary between the language units, the prosodic control rule whose condition meets the type determined.

17. The computer implemented speech synthesis method according to claim 16, wherein the prosodic control rules are generated based on a plurality of learning data items each concerning prosody and including the type of the prosodic boundary between the language units.

18. The computer implemented speech synthesis method according to claim 13, wherein the determining the type includes: selecting, from a plurality of groups each including a plurality of prosodic boundary estimation rules each including a condition for the punctuation mark incidence between the language units in order to determine the type of the prosodic boundary between the language units, a plurality of prosodic boundary estimation rules whose conditions meet the punctuation mark incidence between the language units estimated respectively, and determining the type of the prosodic boundary according to a majority decision rule among the prosodic boundary estimation rules selected.

19. A prosodic control rule generation apparatus including:

a dividing unit configured to divide an input text into language units;

an estimation unit configured to estimate a punctuation mark incidence at a boundary between the language units, the punctuation mark incidence indicating a degree that a punctuation mark occurs at the boundary, based on attribute information items of a plurality of language units adjacent to the boundary; and a generation unit configured to generate a prosodic control rule for speech synthesis including a condition for the punctuation mark incidence based on a plurality of learning data items each concerning prosody and including the punctuation mark incidence.

20. A prosodic control rule generation apparatus including:

a dividing unit configured to divide an input text into language units;

an estimation unit configured to estimate a punctuation mark incidence at a boundary between language units in the input text, the punctuation mark incidence indicating a degree that a punctuation mark occurs at the boundary, based on attribute information items of a plurality of language units adjacent to the boundary;

a first generation unit configured to generate a plurality of learning data items each concerning prosodic boundary between the language units and including the punctuation mark incidence between the language units; and a second generation unit configured to generate a prosodic boundary estimation rule for determining a type of a prosodic boundary and including a condition for the punctuation mark incidence between the language units based on the learning data items concerning prosodic boundary.

21. The prosodic control rule generation apparatus according to claim 20, further including:

a third generation unit configured to generate a plurality of learning data items each concerning prosody and including the type of the prosodic boundary between language units; and a fourth generation unit configured to generate a prosodic control rule for speech synthesis including a condition for the type of the prosodic boundary based on the learning data items concerning prosody.

22. A speech synthesis apparatus comprising:

a dividing unit configured to divide an input text into language units;

an estimation unit configured to estimate a punctuation mark incidence at a boundary between language units in the input text, the punctuation mark incidence indicating a degree that a punctuation mark occurs at the boundary, based on attribute information items of a plurality of language units adjacent to the boundary;

a selecting unit configured to select a prosodic control rule for speech synthesis based on the punctuation mark incidence; and a synthesizing unit configured to synthesize a speech corresponding to the input text using the selected prosodic control rule.

23. The speech synthesis apparatus according to claim 22, further comprising:

a memory to store a plurality of prosodic control rules for speech synthesis each including a condition for the punctuation mark incidence between the language units; and wherein the selecting unit selects, from the prosodic control rules for speech synthesis, the prosodic control rule whose condition meets the punctuation mark incidence between the language units estimated.

24. A speech synthesis apparatus comprising:

a dividing unit configured to divide an input text into language units;

an estimation unit configured to estimate a punctuation mark incidence at a boundary between language units in the input text, the punctuation mark incidence indicating a degree that a punctuation mark occurs at the boundary, based on attribute information items of a plurality of language units adjacent to the boundary;

a determination unit configured to determine a type of a prosodic boundary between the language units based on the punctuation mark incidence between the language units estimated;

a selecting unit configured to select a prosodic control rule for speech synthesis based on the type of the prosodic boundary between the language units determined; and a synthesizing unit configured to synthesize a speech corresponding to the input text using the prosodic control rule selected.

25. The speech synthesis apparatus according to claim 24, further comprising:

a first memory to store a group of a plurality of prosodic boundary estimation rules each including a condition for the punctuation mark incidence between the language units in order to determine the type of the prosodic boundary between the language units; and wherein the determination unit selects, from the group of a plurality of prosodic boundary estimation rules, the prosodic boundary estimation rule whose condition meets the punctuation mark incidence between the language units estimated, and determines the type of the prosodic boundary between the language units based on the prosodic boundary estimation rule selected.

26. The speech synthesis apparatus according to claim 24, further comprising:

a second memory to store a plurality of prosodic control rules for speech synthesis each including a condition for a type of the prosodic boundary between the language units; and wherein the selecting unit selects, from the prosodic control rules for speech synthesis, the prosodic control rule whose condition meets the type determined.

27. The speech synthesis apparatus according to claim 24, further comprising:

a first memory to store a plurality of groups each including a plurality of prosodic boundary estimation rules each including a condition for the punctuation mark incidence between the language units in order to determine the type of the prosodic boundary between the language units; and wherein the determination unit selects, from the groups, a plurality of prosodic boundary estimation rules whose conditions meet the punctuation mark incidence between the language units estimated respectively, and determines the type of the prosodic boundary according to a majority decision rule among the prosodic boundary estimation rules selected.

* * * * *